(12) United States Patent
Martino

(10) Patent No.: US 9,779,780 B2
(45) Date of Patent: Oct. 3, 2017

(54) DAMPING VIBRATIONS WITHIN STORAGE DEVICE TESTING SYSTEMS

(75) Inventor: Peter Martino, Windham, NH (US)

(73) Assignee: Teradyne, Inc., North Reading, MA (US)

( * ) Notice: Subject to any disclaimer, the term of this patent is extended or adjusted under 35 U.S.C. 154(b) by 1372 days.

(21) Appl. No.: 12/817,614

(22) Filed: Jun. 17, 2010

(65) Prior Publication Data
US 2011/0310724 A1  Dec. 22, 2011

(51) Int. Cl.
G11B 33/14 (2006.01)
G11B 33/08 (2006.01)
G11B 33/12 (2006.01)

(52) U.S. Cl.
CPC ............ *G11B 33/08* (2013.01); *G11B 33/128* (2013.01)

(58) Field of Classification Search
USPC ...... 360/92.1, 98.04–98.06; 369/30.5–30.58; 414/266, 277, 281; 720/600, 601, 651
See application file for complete search history.

(56) References Cited

U.S. PATENT DOCUMENTS

| | | |
|---|---|---|
| 557,186 A | 3/1896 | Cahill |
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |

(Continued)

FOREIGN PATENT DOCUMENTS

| | | |
|---|---|---|
| AU | 583716 | 5/1989 |
| CN | 1177187 | 3/1998 |

(Continued)

OTHER PUBLICATIONS

Exhibit 1 in *Xyratex Technology, LTD v. Teradyne, Inc.*; Newspaper picture that displays the CSO tester; 1990.

(Continued)

*Primary Examiner* — Gustavo Polo
(74) *Attorney, Agent, or Firm* — Choate, Hall & Stewart LLP

(57) ABSTRACT

A storage device test slot includes a housing. The housing defines a test compartment for receiving a storage device for testing. One or more tuned mass dampers are connected to the housing. The one or more tuned mass dampers are configured to inhibit vibration of the housing at one or more predetermined frequencies.

14 Claims, 17 Drawing Sheets

(56) References Cited

U.S. PATENT DOCUMENTS

| | | |
|---|---|---|
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bolognia |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,166,901 A * | 12/2000 | Gamble et al. .......... 361/679.34 |
| 6,169,413 B1 | 1/2001 | Paek et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 | 5/2001 | Shen |
| 6,236,563 B1 | 5/2001 | Buican et al. |
| 6,247,944 B1 | 6/2001 | Bologna et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bologna et al. |
| 6,304,839 B1 | 10/2001 | Ho et al. |
| 6,307,386 B1 | 10/2001 | Fowler et al. |
| 6,327,150 B1 | 12/2001 | Levy et al. |
| 6,330,154 B1 | 12/2001 | Fryers et al. |
| 6,351,379 B1 | 2/2002 | Cheng |
| 6,354,792 B1 | 3/2002 | Kobayashi et al. |
| 6,356,409 B1 | 3/2002 | Price et al. |
| 6,356,415 B1 | 3/2002 | Kabasawa |

(56) References Cited

U.S. PATENT DOCUMENTS

| | | |
|---|---|---|
| 6,384,995 B1 | 5/2002 | Smith |
| 6,388,437 B1 | 5/2002 | Wolski et al. |
| 6,388,875 B1 | 5/2002 | Chen |
| 6,388,878 B1 | 5/2002 | Chang |
| 6,389,225 B1 | 5/2002 | Malinoski et al. |
| 6,411,584 B2 | 6/2002 | Davis et al. |
| 6,421,236 B1 | 7/2002 | Montoya et al. |
| 6,434,000 B1 | 8/2002 | Pandolfi |
| 6,434,498 B1 | 8/2002 | Ulrich et al. |
| 6,434,499 B1 | 8/2002 | Ulrich et al. |
| 6,464,080 B1 | 10/2002 | Morris et al. |
| 6,467,153 B2 | 10/2002 | Butts et al. |
| 6,473,297 B1 | 10/2002 | Behl et al. |
| 6,473,301 B1 | 10/2002 | Levy et al. |
| 6,476,627 B1 | 11/2002 | Pelissier et al. |
| 6,477,044 B2 | 11/2002 | Foley et al. |
| 6,477,442 B1 | 11/2002 | Valerino, Sr. |
| 6,480,380 B1 | 11/2002 | French et al. |
| 6,480,382 B2 | 11/2002 | Cheng |
| 6,487,071 B1 | 11/2002 | Tata et al. |
| 6,489,793 B2 | 12/2002 | Jones et al. |
| 6,494,663 B2 | 12/2002 | Ostwald et al. |
| 6,525,933 B2 | 2/2003 | Eland |
| 6,526,841 B1 | 3/2003 | Wanek et al. |
| 6,535,384 B2 | 3/2003 | Huang |
| 6,537,013 B2 | 3/2003 | Emberty et al. |
| 6,544,309 B1 | 4/2003 | Hoefer et al. |
| 6,546,445 B1 | 4/2003 | Hayes |
| 6,553,532 B1 | 4/2003 | Aoki |
| 6,560,107 B1 | 5/2003 | Beck et al. |
| 6,565,163 B2 | 5/2003 | Behl et al. |
| 6,566,859 B2 | 5/2003 | Wolski et al. |
| 6,567,266 B2 | 5/2003 | Ives et al. |
| 6,570,734 B2 | 5/2003 | Ostwald et al. |
| 6,577,586 B1 | 6/2003 | Yang et al. |
| 6,577,687 B2 | 6/2003 | Hall et al. |
| 6,618,254 B2 | 9/2003 | Ives |
| 6,626,846 B2 | 9/2003 | Spencer |
| 6,628,518 B2 | 9/2003 | Behl et al. |
| 6,635,115 B1 | 10/2003 | Fairbairn et al. |
| 6,640,235 B1 | 10/2003 | Anderson |
| 6,644,982 B1 | 11/2003 | Ondricek et al. |
| 6,651,192 B1 | 11/2003 | Viglione et al. |
| 6,654,240 B1 | 11/2003 | Tseng et al. |
| 6,679,128 B2 | 1/2004 | Wanek et al. |
| 6,693,757 B2 | 2/2004 | Hayakawa et al. |
| 6,741,529 B1 | 5/2004 | Getreuer |
| 6,746,648 B1 | 6/2004 | Mattila et al. |
| 6,751,093 B1 | 6/2004 | Hsu et al. |
| 6,791,785 B1 | 9/2004 | Messenger et al. |
| 6,791,799 B2 | 9/2004 | Fletcher |
| 6,798,651 B2 | 9/2004 | Syring et al. |
| 6,798,972 B1 | 9/2004 | Ito et al. |
| 6,801,834 B1 | 10/2004 | Konshak et al. |
| 6,806,700 B2 | 10/2004 | Wanek et al. |
| 6,811,427 B2 | 11/2004 | Garrett et al. |
| 6,826,046 B1 | 11/2004 | Muncaster et al. |
| 6,830,372 B2 | 12/2004 | Liu et al. |
| 6,832,929 B2 | 12/2004 | Garrett et al. |
| 6,861,861 B2 | 3/2005 | Song et al. |
| 6,862,173 B1 | 3/2005 | Konshak et al. |
| 6,867,939 B2 | 3/2005 | Katahara et al. |
| 6,892,328 B2 | 5/2005 | Klein et al. |
| 6,904,479 B1 | 6/2005 | Hall et al. |
| 6,908,330 B2 | 6/2005 | Garrett et al. |
| 6,928,336 B2 | 8/2005 | Peshkin et al. |
| 6,937,432 B2 | 8/2005 | Sri-Jayantha et al. |
| 6,957,291 B2 | 10/2005 | Moon et al. |
| 6,965,811 B2 | 11/2005 | Dickey et al. |
| 6,974,017 B2 | 12/2005 | Oseguera |
| 6,976,190 B1 | 12/2005 | Goldstone |
| 6,980,381 B2 | 12/2005 | Gray et al. |
| 6,982,872 B2 | 1/2006 | Behl et al. |
| 7,006,325 B2 | 2/2006 | Emberty et al. |
| 7,039,924 B2 | 5/2006 | Goodman et al. |
| 7,054,150 B2 | 5/2006 | Orriss et al. |
| 7,070,323 B2 | 7/2006 | Wanek et al. |
| 7,076,391 B1 | 7/2006 | Pakzad et al. |
| 7,077,614 B1 | 7/2006 | Hasper et al. |
| 7,088,541 B2 | 8/2006 | Orriss et al. |
| 7,092,251 B1 | 8/2006 | Henry |
| 7,106,582 B2 | 9/2006 | Albrecht et al. |
| 7,123,477 B2 | 10/2006 | Coglitore et al. |
| 7,126,777 B2 | 10/2006 | Flechsig et al. |
| 7,130,138 B2 | 10/2006 | Lum et al. |
| 7,134,553 B2 | 11/2006 | Stephens |
| 7,139,145 B1 | 11/2006 | Archibald et al. |
| 7,164,579 B2 | 1/2007 | Muncaster et al. |
| 7,167,360 B2 | 1/2007 | Inoue et al. |
| 7,181,458 B1 | 2/2007 | Higashi |
| 7,203,021 B1 | 4/2007 | Ryan et al. |
| 7,203,060 B2 | 4/2007 | Kay et al. |
| 7,206,201 B2 | 4/2007 | Behl et al. |
| 7,216,968 B2 | 5/2007 | Smith et al. |
| 7,219,028 B2 | 5/2007 | Bae et al. |
| 7,219,273 B2 | 5/2007 | Fisher et al. |
| 7,227,746 B2 | 6/2007 | Tanaka et al. |
| 7,232,101 B2 | 6/2007 | Wanek et al. |
| 7,243,043 B2 | 7/2007 | Shin |
| 7,248,467 B2 | 7/2007 | Sri-Jayantha et al. |
| 7,259,966 B2 | 8/2007 | Connelly, Jr. et al. |
| 7,273,344 B2 | 9/2007 | Ostwald et al. |
| 7,280,353 B2 | 10/2007 | Wendel et al. |
| 7,289,885 B2 | 10/2007 | Basham et al. |
| 7,304,855 B1 | 12/2007 | Milligan et al. |
| 7,315,447 B2 | 1/2008 | Inoue et al. |
| 7,349,205 B2 | 3/2008 | Hall et al. |
| 7,353,524 B1 | 4/2008 | Lin et al. |
| 7,385,385 B2 | 6/2008 | Magliocco et al. |
| 7,395,133 B2 | 7/2008 | Lowe |
| 7,403,451 B2 | 7/2008 | Goodman et al. |
| 7,421,623 B2 | 9/2008 | Haugh .......................... 714/47 |
| 7,437,212 B2 | 10/2008 | Farchmin et al. |
| 7,447,011 B2 | 11/2008 | Wade et al. |
| 7,457,112 B2 | 11/2008 | Fukuda et al. |
| 7,467,024 B2 | 12/2008 | Flitsch |
| 7,476,362 B2 | 1/2009 | Angros |
| 7,483,269 B1 | 1/2009 | Marvin, Jr. et al. |
| 7,505,264 B2 | 3/2009 | Hall et al. |
| 7,554,811 B2 | 6/2009 | Scicluna et al. |
| 7,568,122 B2 | 7/2009 | Mechalke et al. |
| 7,570,455 B2 | 8/2009 | Deguchi et al. |
| 7,573,715 B2 | 8/2009 | Mojaver et al. |
| 7,584,851 B2 | 9/2009 | Hong et al. |
| 7,612,996 B2 | 11/2009 | Atkins et al. |
| 7,625,027 B2 | 12/2009 | Kiaie et al. |
| 7,630,196 B2 | 12/2009 | Hall et al. |
| 7,643,289 B2 | 1/2010 | Ye et al. |
| 7,646,596 B2 | 1/2010 | Ng |
| 7,729,107 B2 | 6/2010 | Atkins et al. |
| 2001/0006453 A1 | 7/2001 | Glorioso et al. |
| 2001/0044023 A1 | 11/2001 | Johnson et al. |
| 2001/0046118 A1 | 11/2001 | Yamanashi et al. |
| 2001/0048590 A1 | 12/2001 | Behl et al. |
| 2002/0030981 A1 | 3/2002 | Sullivan et al. |
| 2002/0044416 A1 | 4/2002 | Harmon, III et al. |
| 2002/0051338 A1 | 5/2002 | Jiang et al. |
| 2002/0071248 A1 | 6/2002 | Huang et al. |
| 2002/0079422 A1 | 6/2002 | Jiang |
| 2002/0090320 A1 | 7/2002 | Burow et al. |
| 2002/0116087 A1 | 8/2002 | Brown |
| 2002/0161971 A1 | 10/2002 | Dimitri et al. |
| 2002/0172004 A1 | 11/2002 | Ives et al. |
| 2003/0035271 A1 | 2/2003 | Lelong et al. |
| 2003/0043550 A1 | 3/2003 | Ives |
| 2003/0155460 A1 | 8/2003 | Hiraguchi |
| 2003/0206397 A1 | 11/2003 | Allgeyer et al. |
| 2004/0165489 A1 | 8/2004 | Goodman et al. |
| 2004/0230399 A1 | 11/2004 | Shin |
| 2004/0236465 A1 | 11/2004 | Butka et al. |
| 2004/0264121 A1 | 12/2004 | Orriss et al. |
| 2005/0004703 A1 | 1/2005 | Christie |
| 2005/0010836 A1 | 1/2005 | Bae et al. |
| 2005/0018397 A1 | 1/2005 | Kay et al. |

(56) References Cited

U.S. PATENT DOCUMENTS

| | | | |
|---|---|---|---|
| 2005/0055601 A1 | 3/2005 | Wilson et al. | |
| 2005/0057849 A1 | 3/2005 | Twogood et al. | |
| 2005/0069400 A1 | 3/2005 | Dickey et al. | |
| 2005/0109131 A1 | 5/2005 | Wanek et al. | |
| 2005/0116702 A1 | 6/2005 | Wanek et al. | |
| 2005/0131578 A1 | 6/2005 | Weaver | |
| 2005/0179457 A1 | 8/2005 | Min et al. | |
| 2005/0207059 A1 | 9/2005 | Cochrane | |
| 2005/0219809 A1 | 10/2005 | Muncaster et al. | |
| 2005/0225338 A1 | 10/2005 | Sands et al. | |
| 2005/0270737 A1 | 12/2005 | Wilson et al. | |
| 2006/0010353 A1 | 1/2006 | Haugh | 714/47 |
| 2006/0023331 A1 | 2/2006 | Flechsig et al. | |
| 2006/0028802 A1 | 2/2006 | Shaw et al. | |
| 2006/0066974 A1 | 3/2006 | Akamatsu et al. | |
| 2006/0130316 A1 | 6/2006 | Takase et al. | |
| 2006/0190205 A1 | 8/2006 | Klein et al. | |
| 2006/0227517 A1 | 10/2006 | Zayas et al. | |
| 2006/0250766 A1 | 11/2006 | Blaalid et al. | |
| 2006/0269384 A1 | 11/2006 | Kiaie et al. | |
| 2007/0034368 A1 | 2/2007 | Atkins et al. | |
| 2007/0035874 A1 | 2/2007 | Wendel et al. | |
| 2007/0035875 A1 | 2/2007 | Hall et al. | |
| 2007/0053154 A1 | 3/2007 | Fukuda et al. | |
| 2007/0082907 A1 | 4/2007 | Canada et al. | |
| 2007/0127202 A1 | 6/2007 | Scicluna et al. | |
| 2007/0127206 A1 | 6/2007 | Wade et al. | |
| 2007/0195497 A1 | 8/2007 | Atkins | |
| 2007/0248142 A1 | 10/2007 | Rountree et al. | |
| 2007/0253157 A1 | 11/2007 | Atkins et al. | |
| 2007/0286045 A1 | 12/2007 | Onagi et al. | |
| 2008/0007865 A1 | 1/2008 | Orriss et al. | |
| 2008/0030945 A1 | 2/2008 | Mojaver et al. | |
| 2008/0112075 A1 | 5/2008 | Farquhar et al. | |
| 2008/0239564 A1 | 10/2008 | Farquhar et al. | |
| 2008/0282275 A1 | 11/2008 | Zaczek et al. | |
| 2008/0282278 A1 | 11/2008 | Barkley | |
| 2009/0028669 A1 | 1/2009 | Rebstock | |
| 2009/0082907 A1 | 3/2009 | Stuvel et al. | |
| 2009/0122443 A1 | 5/2009 | Farquhar et al. | |
| 2009/0142169 A1 | 6/2009 | Garcia et al. | |
| 2009/0153992 A1 | 6/2009 | Garcia et al. | |
| 2009/0153993 A1 | 6/2009 | Garcia et al. | |
| 2009/0153994 A1 | 6/2009 | Merrow et al. | |
| 2009/0175705 A1 | 7/2009 | Nakao et al. | |
| 2009/0261047 A1 | 10/2009 | Merrow | |
| 2009/0261228 A1 | 10/2009 | Merrow | |
| 2009/0261229 A1 | 10/2009 | Merrow | |
| 2009/0262444 A1 | 10/2009 | Polyakov et al. | |
| 2009/0262445 A1 | 10/2009 | Noble et al. | |
| 2009/0262454 A1 | 10/2009 | Merrow | |
| 2009/0262455 A1 | 10/2009 | Merrow | |
| 2009/0265032 A1 | 10/2009 | Toscano et al. | |
| 2009/0265043 A1 | 10/2009 | Merrow et al. | |
| 2009/0265136 A1 | 10/2009 | Garcia et al. | |
| 2009/0297328 A1* | 12/2009 | Slocum, III | 414/806 |
| 2010/0140855 A1 | 6/2010 | Gustavsson | |

FOREIGN PATENT DOCUMENTS

| | | |
|---|---|---|
| CN | 2341188 | 9/1999 |
| CN | 1114109 | 7/2003 |
| CN | 1192544 | 3/2005 |
| DE | 3786944 | 11/1993 |
| DE | 69111634 | 5/1996 |
| DE | 69400145 | 10/1996 |
| DE | 19701548 | 8/1997 |
| DE | 19804813 | 9/1998 |
| DE | 69614460 | 6/2002 |
| DE | 69626584 | 12/2003 |
| DE | 19861388 | 8/2007 |
| EP | 0210497 | 7/1986 |
| EP | 0242970 | 10/1987 |
| EP | 0 277 634 A | 8/1988 |
| EP | 0356977 | 8/1989 |
| EP | 0442642 | 2/1991 |
| EP | 0466073 | 7/1991 |
| EP | 0776009 | 11/1991 |
| EP | 0582017 | 2/1994 |
| EP | 0617570 | 9/1994 |
| EP | 0635836 | 1/1995 |
| EP | 741508 | 11/1996 |
| EP | 0757320 | 2/1997 |
| EP | 0757351 | 2/1997 |
| EP | 0840476 | 5/1998 |
| EP | 1 045 301 A | 10/2000 |
| EP | 1209557 | 5/2002 |
| EP | 1422713 | 5/2004 |
| EP | 1234308 | 5/2006 |
| EP | 1760722 | 3/2007 |
| EP | 1612798 | 11/2007 |
| GB | 2241118 | 8/1991 |
| GB | 2276275 | 9/1994 |
| GB | 2299436 | 10/1996 |
| GB | 2312984 | 11/1997 |
| GB | 2328782 | 3/1999 |
| GB | 2439844 | 7/2008 |
| JP | 61-115279 | 6/1986 |
| JP | 62-177621 | 8/1987 |
| JP | 62-239394 | 10/1987 |
| JP | 62-251915 | 11/1987 |
| JP | 63-002160 | 1/1988 |
| JP | 63-004483 | 1/1988 |
| JP | 63-016482 | 1/1988 |
| JP | 63-062057 | 3/1988 |
| JP | 63-201946 | 8/1988 |
| JP | 63-214972 | 9/1988 |
| JP | 63-269376 | 11/1988 |
| JP | 63-195697 | 12/1988 |
| JP | 64-089034 | 4/1989 |
| JP | 2-091565 | 3/1990 |
| JP | 2-098197 | 4/1990 |
| JP | 2-185784 | 7/1990 |
| JP | 2-199690 | 8/1990 |
| JP | 2-278375 | 11/1990 |
| JP | 2-297770 | 12/1990 |
| JP | 3-008086 | 1/1991 |
| JP | 3-078160 | 4/1991 |
| JP | 3-105704 | 5/1991 |
| JP | 3-207947 | 9/1991 |
| JP | 3-210662 | 9/1991 |
| JP | 3-212859 | 9/1991 |
| JP | 3-214490 | 9/1991 |
| JP | 3-240821 | 10/1991 |
| JP | 3-295071 | 12/1991 |
| JP | 4-017134 | 1/1992 |
| JP | 4-143989 | 5/1992 |
| JP | 4-172658 | 6/1992 |
| JP | 4-214288 | 8/1992 |
| JP | 4-247385 | 9/1992 |
| JP | 4-259956 | 9/1992 |
| JP | 4-307440 | 10/1992 |
| JP | 4-325923 | 11/1992 |
| JP | 5-035053 | 2/1993 |
| JP | 5-035415 | 2/1993 |
| JP | 5-066896 | 3/1993 |
| JP | 5-068257 | 3/1993 |
| JP | 5-073566 | 3/1993 |
| JP | 5-073803 | 3/1993 |
| JP | 5-101603 | 4/1993 |
| JP | 5-173718 | 7/1993 |
| JP | 5-189163 | 7/1993 |
| JP | 5-204725 | 8/1993 |
| JP | 5-223551 | 8/1993 |
| JP | 6-004220 | 1/1994 |
| JP | 6-004981 | 1/1994 |
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |

(56) References Cited

FOREIGN PATENT DOCUMENTS

| | | | |
|---|---|---|---|
| JP | 7-056654 | 3/1995 | |
| JP | 7-111078 | 4/1995 | |
| JP | 7-115497 | 5/1995 | |
| JP | 7-201082 | 8/1995 | |
| JP | 7-226023 | 8/1995 | |
| JP | 7-230669 | 8/1995 | |
| JP | 7-257525 | 10/1995 | |
| JP | 1982246 | 10/1995 | |
| JP | 7-307059 | 11/1995 | |
| JP | 8007994 | 1/1996 | |
| JP | 8-030398 | 2/1996 | |
| JP | 8-030407 | 2/1996 | |
| JP | 8-079672 | 3/1996 | |
| JP | 8-106776 | 4/1996 | |
| JP | 8-110821 | 4/1996 | |
| JP | 8-167231 | 6/1996 | |
| JP | 8-212015 | 8/1996 | |
| JP | 8-244313 | 9/1996 | |
| JP | 8-263525 | 10/1996 | |
| JP | 8-263909 | 10/1996 | |
| JP | 8-297957 | 11/1996 | |
| JP | 2553315 | 11/1996 | |
| JP | 9-044445 | 2/1997 | |
| JP | 9-064571 | 3/1997 | |
| JP | 9-082081 | 3/1997 | |
| JP | 2635127 | 7/1997 | |
| JP | 9-306094 | 11/1997 | |
| JP | 9-319466 | 12/1997 | |
| JP | 10-040021 | 2/1998 | |
| JP | 10-049365 | 2/1998 | |
| JP | 10-064173 | 3/1998 | |
| JP | 10-098521 | 4/1998 | |
| JP | 2771297 | 7/1998 | |
| JP | 10-275137 | 10/1998 | |
| JP | 10-281799 | 10/1998 | |
| JP | 10-320128 | 12/1998 | |
| JP | 10-340139 | 12/1998 | |
| JP | 2862679 | 3/1999 | |
| JP | 11-134852 | 5/1999 | |
| JP | 11-139839 | 5/1999 | |
| JP | 2906930 | 6/1999 | |
| JP | 11-203201 | 7/1999 | |
| JP | 11-213182 | 8/1999 | |
| JP | 11-327800 | 11/1999 | |
| JP | 11-353128 | 12/1999 | |
| JP | 11-353129 | 12/1999 | |
| JP | 2000-056935 | 2/2000 | |
| JP | 2000-066845 | 3/2000 | |
| JP | 2000-112831 | 4/2000 | |
| JP | 2000-113563 | 4/2000 | |
| JP | 2000-114759 | 4/2000 | |
| JP | 2000-125290 | 4/2000 | |
| JP | 3052183 | 4/2000 | |
| JP | 2000-132704 | 5/2000 | |
| JP | 2000-149431 | 5/2000 | |
| JP | 2000-228686 | 8/2000 | |
| JP | 2000-235762 | 8/2000 | |
| JP | 2000-236188 | 8/2000 | |
| JP | 2000-242598 | 9/2000 | |
| JP | 2000-278647 | 10/2000 | |
| JP | 3097994 | 10/2000 | |
| JP | 2000-305860 | 11/2000 | |
| JP | 2001-005501 | 1/2001 | |
| JP | 2001-023270 | 1/2001 | |
| JP | 2001-100925 | 4/2001 | |
| JP | 2002-42446 | 2/2002 | |
| JP | 2007-87498 | 4/2007 | |
| JP | 2007-188615 | 7/2007 | |
| JP | 2007-220184 | 8/2007 | |
| JP | 2007-293936 | 11/2007 | |
| JP | 2007-305206 | 11/2007 | |
| JP | 2007-305290 | 11/2007 | |
| JP | 2007-328761 | 12/2007 | |
| JP | 2008-503824 | 2/2008 | |
| KR | 10-1998-0035445 | 8/1998 | |
| KR | 10-0176527 | 11/1998 | |
| KR | 10-0214308 | 8/1999 | |
| KR | 10-0403039 | 10/2003 | |
| KR | 10-0436885 | 6/2004 | G11B 33/08 |
| SG | 45223 | 1/1998 | |
| TW | 387574 | 4/2000 | |
| WO | WO 89/01682 | 8/1988 | |
| WO | WO 97/06532 | 2/1997 | |
| WO | WO 00/49487 | 2/2000 | |
| WO | WO 00/67253 | 11/2000 | |
| WO | WO 01/09627 | 2/2001 | |
| WO | WO 01/41148 | 6/2001 | |
| WO | WO 03/013783 | 2/2003 | |
| WO | WO 03/021597 | 3/2003 | |
| WO | WO 03/021598 | 3/2003 | |
| WO | WO 03/067385 | 8/2003 | |
| WO | WO 2004/006260 | 1/2004 | |
| WO | WO 2004/114286 | 12/2004 | |
| WO | WO 2005/024830 | 3/2005 | |
| WO | WO 2005/024831 | 3/2005 | |
| WO | WO 2005/109131 | 11/2005 | |
| WO | WO 2006/030185 | 3/2006 | |
| WO | WO 2006/048611 | 5/2006 | |
| WO | WO 2006/100441 | 9/2006 | |
| WO | WO 2006/100445 | 9/2006 | |
| WO | WO 2007/031729 | 3/2007 | |

OTHER PUBLICATIONS

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD*. V. *Teradyne, Inc.*; Case, "Last products of Disk-File Development at Hursley and Millbrook," IBM, Oct. 12, 1990.

Exhibit 1315 in *Xyratex Technology, LTD*. V. *Teradyne, Inc.*; Case, "History of Disk-File Development at Hursley and Millbrook," IBM, Oct. 17, 1990.

*Xyratex Technology, LTD*. V. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, LTD*. V. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

International Preliminary Report on Patentability mailed Jan. 3, 2013, in international application No. PCT/US2011/040349, 5 pgs.

Notification of Transmittal of the International Search Report and the Written Opinion of the International Searching Authority, or the Declaration for International Application No. PCT/US2011/040349 dated Feb. 23, 2012.

Bakre, "Optimum parameters of tuned mass damper for damped main system," Structural Control and Health Monitoring, Struct. Control Health Monit. 2007; 14:448-470.

"Tuned Mass Damper Systems", ConCh04v2.fm, downloaded from internet Jul. 11, 2002 at 'https://engineering.purdue.edu/~ce573/Documents/Intro%20to%20Structural%20Motion%20Control_Chapter4.pdf', pp. 217-285.

Abraham et al., "Thermal Proximity Imaging of Hard-Disk Substrates", IEEE Transactions on Mathematics 36:3997-4004, Nov. 2000.

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

(56) References Cited

OTHER PUBLICATIONS

Anderson et al., "Clinical chemistry: concepts and applications", The McGraw-Hill Companies, Inc., pp. 131-132, 2003.
Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.
Asbrand, "Engineers at One Company Share the Pride and the Profits of Successful Product Design", Professional Issues, 4 pages, 1987.
Bair et al., "Measurements of Asperity Temperatures of a Read/Write Head Slider Bearing in Hard Magnetic Recording Disks", Journal of Tribology 113:547-554, Jul. 1991.
Bakken et al., "Low Cost, Rack Mounted, Direct Access Disk Storage Device", www.ip.com, 4 pages, Mar. 3, 2005.
Biber et al., "Disk Drive Drawer Thermal Management", Advances in Electronic Packaging vol. 1:43-46, 1995.
Christensen, "How Can Great firms Fail? Insights from the hard Disk Drive Industry", Harvard Business School Press, pp. 1-26, 2006.
Chung et al., "Vibration Absorber for Reduction of the In-plane Vibration in an Optical Disk Drive", IEEE Transactions on Consumer Electronics, Vo. 48, May 2004.
Curtis et al., "InPhase Professional Archive Drive Architecture" Dec. 17, 2007 http://www.science.edu/TechoftheYear/Nominees/InPhase/Holographic%20Storage.pdf.
Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.
FlexStar Technology, 30E/Cascade Users Manual, Doc #98-36387-00 Rev. 1.8, pp. 1-33, Jun. 1, 2004.
FlexStar Technology, "A World of Storage Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).
Fmnkovich, "The Basics of Vibration Isolation Using Elastomeric Materials", EARSC, 2005 http://www.isoloss.com/pdfs/engineering/BasicsofVibrationIsolation.pdf.
Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.
Gurumurthi et al., "Disk Drive Roadmap from the Thermal Perspective: A Case for Dynamic Thermal Management", International Symposium on Computer Architecture, Proceedings of the $32^{nd}$ Annual International Symposium on Computer Architecture, IEEE Computer Society, pp. 38-49, 2005 http://portal.acm.org/citation.cfm?id=1069807.1069975.
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.
Henderson, "HAD High Aerial Densities Require Solid Test Fixtures", Flexstar Technology, Feb. 26, 2007.
HighBeam Research website "ACT debuts six-zone catalytic gas heater. (American Catalytic Technologies offers new heaters)" www.highbeam.com, 4 pages, 1998.
HighBeam Research website "Asynchronous Testing Increases Throughput." www.highbeam.com, 7 pages, 2000.
HighBeam Research website "Credence announces Production Release of the EPRO AQ Series for Integrated Test and Back-end Processing." www.highbeam.com, 4 pages, 1995.
HighBeam Research website "Test Multiple Parts At Once for Air Leaks. (Brief Article)", www.highbeam.com, 1 page, 1999.
Iwamiya, "Hard Drive Cooling Using a Thermoelectric Cooler", EEP-vol. 19-2, Advances in Electronic Packaging, vol. 2:2203-2208, ASME 1997.
Johnson et al., "Performance Measurements of Tertiary Storage Devices", Proceedings of the $24^{th}$ VLDB Conference, New York, pp. 50-61, 1998.
Ku, "Investigation of Hydrodynamic Bearing Friction in Data Storage information System Spindle Motors", ISPSvol. 1, Advances in Information Storage and Processing Systems, pp. 159-165, ASME 1995.
Lindner, "Disk drive mounting", IBM Technical Disclosure Brochure, vol. 16, No. 3, pp. 903-904, Aug. 1973.
McAuley, "Recursive Time Trapping for Synchronization of Product and Chamber Profiles for Stress Test", Delphion, www.delphion.com/tdbs/tdb?order=88A+60957, 3 pages, Mar. 18, 2009.
Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.
Morris, "Zero Cost Power and Cooling Monitor System", www.delphion.com/tdbs/tdb?order=94A+61950, 3 pages, Jan. 15, 2008.
Nagarajan, "Survey of Cleaning and cleanliness Measurement in Disk Drive Manufacture", North Carolina Department of Environment and Natural Resources, Feb. 1997.
Notification of Transmittal of The International Search Report and the Written Opinion of the International Searching Authority, or the Declaration, PCT/US2008/086181, 15 pages, Mar. 16, 2009.
Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.
Prater et al., "Thermal and Heat-Flow Aspects of Actuators for Hard Disk Drives", InterSociety Conference on Thermal Phenomena, pp. 261-268, 1994.
Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.
Seagate Product Marketing, "Seagate's Advanced Multidrive System (SAMS) Rotational Vibration Feature", Publication TP-229D, Feb. 2000.
Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.
Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.
Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.
Tzeng, "Dynamic Torque Characteriestics of Disk-Drive Spindle Bearings", ISPS-vol. 1, Advances in Information Storage and Processing Systems, pp. 57-63, ASME 1995.
Tzeng, "Measurements of Transient Thermal Strains in a Disk-Drive Actuator", InterSociety conference on Thermal Phenomena, pp. 269-274, 1994.
Wilson-7000 disk Drive Analyzer Product Literature, date accessed Jan. 28, 2009, 2 pages.
Winchester, "Automation Specialists Use Machine Vision as a System Development Tool", IEE Computing & Control Engineering, Jun./Jul. 2003.
Xyratex website "Storage Infrastructure" www.xyratex.com/Products/storage-infrastructure/default.aspx 1995-2008.

(56) References Cited

OTHER PUBLICATIONS

Xyratex website "Production Test Systems" www.xyratex.com/Products/production-test-systems/default.aspx 1995-2008.
Xyratex website "Single cell—Production Test Systems" www.xyratex.com/products/production-test-systems/single-cell.aspx 1995-2008.
Xyratex website "Continuous Innovation—Production Test Systems" www.xyratex.com/products/production-test-systems/continuous-innovation.aspx 1995-2008.
Xyratex website "Key Advantages—Production Test Systems" www.xyratex.com/products/production-test-systems/advantages.aspx 1995-2008.
Xyratex website "Testing Drives Colder—Production Test Systems" www.xyratex.com/products/productino-test-systems/colder.aspx 1995-2008.
"Xyratex to Debut its New Automated Test Solution for 2.5-Inch Disk Drives at Diskcon USA 2004" 2004 PR Newswire Europe www.prnewswire.co.uk/cgi/news/release?id=130103.
"Automated Production Test Solutions", Xyratex Product Test brochure, 2006.
Xyratex "Process Challenges in the Hard Drive Industry" slide presentation, 2006 Asian Diskcon.
Suwa et al., "Evaluation System for Residual Vibration from HDD Mounting Mechanism" IEEE Transactions on Magnetics, vol. 35, No. 2, pp. 868-873, Mar. 1999.
Suwa et al., "Rotational Vibration Suppressor" IBM Technical Disclosure Bulletin Oct. 1991.
Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.
Annex to Form PCT/ASA/206 Communication Relating to the Results of the Partial International Search, for International Application No. PCT/US2008/086814, dated Apr. 3, 2009, 5 pages.
Annex to Form PCT/ASA/206 Communication Relating to the Results of the Partial International Search, for International Application No. PCT/US2008/086809, dated Apr. 3, 2009, 1 page.
Notification of Transmittal of the International Search Report and the Written Opinion of the International Searching Authority, or the Declaration, for International Application No. PCT/US2009/039926, dated Sep. 1, 2009, 13 pages.
Notification of Transmittal of the International Search Report and the Written Opinion of the International Searching Authority, or the Declaration, for International Application No. PCT/US2009/039591, dated Aug. 31, 2009, 10 pages.
Notification of Transmittal of the International Search Report and the Written Opinion of the International Searching Authority, or the Declaration, for International Application No. PCT/US2008/086814, dated Sep. 18, 2009, 17 pages.
Notification of Transmittal of the International Search Report and the Written Opinion of the International Searching Authority, or the Declaration, for International Application No. PCT/US2009/039888, dated Sep. 28, 2009, 13 pages.
Notification of Transmittal of the International Search Report and the Written Opinion of the International Searching Authority, or the Declaration, for International Application No. PCT/US2009/039921, dated Sep. 25, 2009, 14 pages.
Notification of Transmittal of the International Search Report and the Written Opinion of the International Searching Authority, or the Declaration, for International Application No. PCT/US2009/040058, dated Sep. 29, 2009, 13 pages.
Notification of Transmittal of the International Search Report and the Written Opinion of the International Searching Authority, or the Declaration, for International Application No. PCT/US2009/040829, dated Oct. 28, 2009, 13 pages.
Notification of Transmittal of the International Search Report and the Written Opinion of the International Searching Authority, or the Declaration, for International Application No. PCT/US2009/039590, dated Oct. 30, 2009, 10 pages.
Notification of Transmittal of the International Search Report and the Written Opinion of the International Searching Authority, or the Declaration, for International Application No. PCT/US2009/040835, dated Oct. 30, 2009, 13 pages.
Notification of Transmittal of the International Search Report and the Written Opinion of the International Searching Authority, or the Declaration, for International Application no. PCT/US2009/040757, dated Nov. 24, 2009, 12 pages.
Notification of Transmittal of the International Search Report and the Written Opinion of the International Searching Authority, or the Declaration, for International Application No. PCT/US2009/039898, dated Nov. 24, 2009, 12 pages.
Notification of Transmittal of the International Search Report and the Written Opinion of the International Searching Authority, or the Declaration, for International Application No. PCT/US2009/040795, dated Nov. 26, 2009, 13 pages.
Notification of Transmittal of the International Search Report and the Written Opinion of the International Searching Authority, or the Declaration, for International Application No. PCT/US2009/045583, dated Nov. 27, 2009, 13 pages.
Notification of Transmittal of the International Search Report and the Written Opinion of the International Searching Authority, or the Declaration, for International Application No. PCT/US2009/040888, dated Dec. 29, 2009, 14 pages.
Notification of Transmittal of the International Search Report and the Written Opinion of the International Searching Authority, or the Declaration, for International Application No. PCT/US2009/040894, dated Dec. 22, 2009, 12 pages.
Notification of Transmittal of the International Search Report and the Written Opinion of the International Searching Authority, or the Declaration, for International Application No. PCT/US2009/039934, dated Dec. 23, 2009, 12 pages.
Notification of Transmittal of the International Search Report and the Written Opinion of the International Searching Authority, or the Declaration, for International Application No. PCT/US2009/040965, dated Dec. 23, 2009, 12 pages.
Notification of Transmittal of the International Search Report and the Written Opinion of the International Searching Authority, or the Declaration, for International Application No. PCT/US2009/040973, dated Jan. 11, 2010, 13 pages.
Cardinal Intellectual Property's search report including the results of a search for the features of the claims included in the U.S. Appl. No. entitled "Transferring Disk Drives Within Disk Drive Testing Systems", inventors: Polyakov et al, and having assigned U.S. Appl. No. 12/727,150. The foregoing U.S. Appl No. is a continuation of U.S. Appl. No. 12/104,536. Revised as of May 27, 2010.
Cardinal Intellectual Property's search report including the results of a search for the features of the claims included in the U.S. Appl. No. entitled "Transferring Storage Devices Within Storage Device Testing Systems", inventors: John P. Toscano et al., and having assigned U.S. Appl. No. 12/727,201. The foregoing U.S. Appl. No. is a continuation of U.S. Appl. No. 12/424,980. Revised as of Jan. 4, 2010.
Cardinal Intellectual Property's search report including the results of a search for the features of the claims included in the U.S. Appl. No. entitled "Processing Storage Devices", inventors: Richard W. Slocum III., and having assigned U.S. Appl. No. 12/727,619. The foregoing U.S. Appl. No. is a continuation of U.S. Appl. No. 12/474,388. Revised as of Jan. 5, 2009.
Cardinal Intellectual Property's search report including the results of a search for the features of the claims included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.
Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.

(56) References Cited

OTHER PUBLICATIONS

Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.

Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.

Cardinal Intellectual Property's search report including the results of a search for the features of the claims included in the U.S. patent application entitled " Conductive Heating", inventors: Brian S. Merrow et al., and having assigned U.S. Appl. No. 12/760,164. The foregoing U.S. patent application is a continuation of U.S. Appl. No. 12/ 503,593. Revised as of Jan. 6, 2010.

Cardinal Intellectual Property's search report including the results of a search for the features of the claims included in the U.S. patent application entitled "Storage Device Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. patent application no. 12/105,103. Revised as of Jan. 14, 2010.

Cardinal Intellectual Property's search report including the results of a search for the features of the claims included in the U.S. patent application entitled "Vibration Isolation Within Disk Drive Testing Systems ", with attorney docket number: 18523-0066002, inventors: Brian S. Merrow and having assigned U.S. Appl. No. 12/767,142. The foregoing U.S. patent application is a continuation of U.S. patent application no. 12/105,105. Revised as of Jan. 12, 2010.

Cardinal Intellectual Property's search report including the results of a search for the features of the claims included in the U.S. patent application entitled "Disk Drive Clamping Transport and Testing", with attorney docket number: 18523-0067002, inventors: Brian S. Merrow et al., and having assigned U.S. Appl. No. 12/766,680. The foregoing U.S. patent application is a continuation of U.S. patent application no. 11/959,133. Revised as of Apr. 1, 2010.

Cardinal Intellectual Property's search report including the results of a search for the features of the claims included in the U.S. patent application entitled "Chilled Water Temp Control of Disk Drive Tester", with attorney docket number: 18523-0076002, inventors: Brian S. Merrow and having assigned U.S. Appl. No. 12/766,680. The foregoing U.S. patent application is a continuation of U.S. patent application no. 12/ 105,061. Revised as of Feb. 18, 2010.

Cardinal Intellectual Property's search report including the results of a search for the features of the claims included in the U.S. patent application entitled "Vibration Isolation Within Disk Drive Testing Systems," with attorney docket number: 18523-0066002, inventors: Brian S. Merrow and having assigned U.S. Appl. No. 12/767,142. The foregoing U.S. patent application is a continuation of U.S. patent application no. 12/105,105. Revised as of Mar. 30, 2010.

Cardinal Intellectual Property's search report including the results of a search for the features of the claims included in the U.S. patent application entitled "Disk Drive Clamping Transport and Testing," with attorney docket number: 18523-0067003, inventors: Brian S. Merrow et al., and having assigned U.S. Appl. No. 12/767,113. The foregoing U.S. patent application is a continuation of U.S. patent application no. 11/959,133. Revised as of Apr. 4, 2010.

Cardinal Intellectual Property's search report including the results of a search for the features of the claims included in the U.S. patent application entitled "Disk Drive Clamping Transport and Testing," with attorney docket number: 18523-0067002, inventors: Brian S. Merrow et al., and having assigned U.S. Appl. No. 12/766,680. The foregoing U.S. patent application is a continuation of U.S. patent application no. 11/959,133. Revised as of Apr. 1, 2010.

Rubin, S., Dynamic Vibration Absorbers and Auxiliary Mass Dampers, Harris' Shock and Vibration Handbook, 6th edition, editors Allan G. Piersol and Thomas L. Paez, Chapter 6: pp. 6.1-6.33, (McGraw-Hill Professional, 2010 2002 1995 1988 1976 1961).

\* cited by examiner

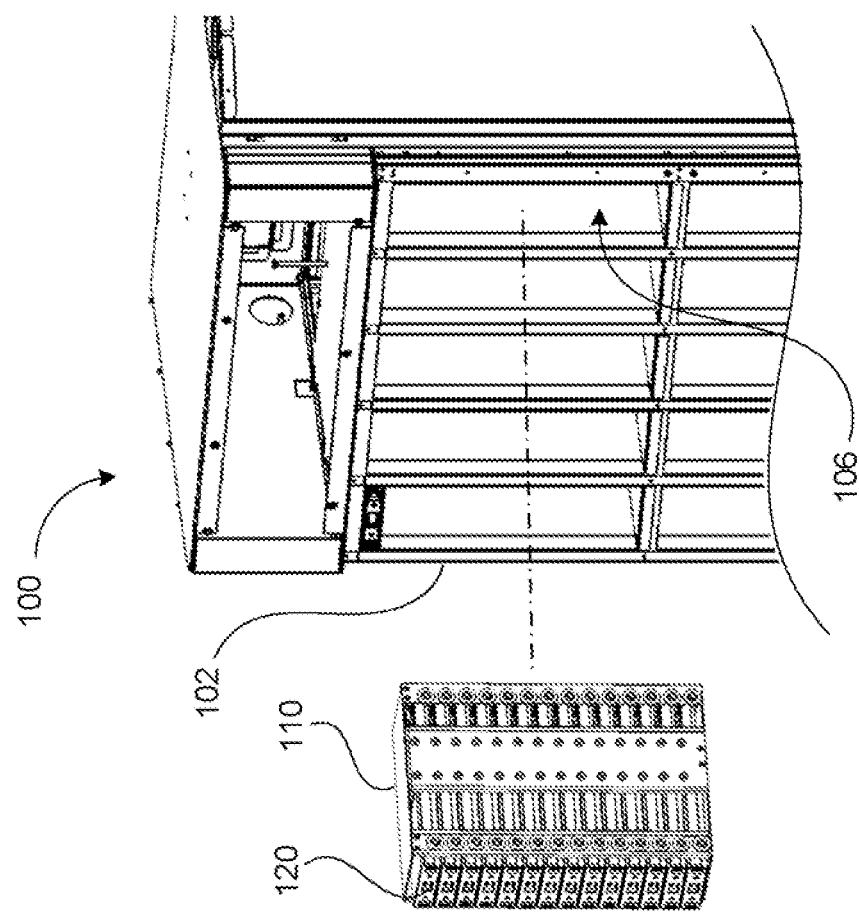

DAMPING VIBRATIONS WITHIN STORAGE DEVICE TESTING SYSTEMS

TECHNICAL FIELD

This disclosure relates to damping vibrations in storage device testing systems.

BACKGROUND

Storage device manufacturers typically test manufactured storage devices for compliance with a collection of requirements. Test equipment and techniques exist for testing large numbers of storage devices serially or in parallel. Manufacturers tend to test large numbers of storage devices simultaneously or in batches. Storage device testing systems typically include one or more tester racks having multiple test slots that receive storage devices for testing. In some cases, the storage devices are placed in carriers which are used for loading and unloading the storage devices to and from the test racks.

The testing environment immediately around the storage device is regulated. Minimum temperature fluctuations in the testing environment may be critical for accurate test conditions and for safety of the storage devices. in addition, the latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower yields and increased manufacturing costs. Current storage device testing systems employ automation and structural support systems that contribute to excess vibrations in the system and/or require large footprints.

SUMMARY

In general, this disclosure relates to test slot carriers, and related devices, systems, and methods.

In one aspect, a storage device test slot includes a housing. The housing defines a test compartment for receiving a storage device for testing. The test slot also includes one or more tuned mass dampers that are connected (e.g., integrally formed with or coupled with adhesive, fasteners, etc.) to the housing. The one or more tuned mass dampers are configured to inhibit vibration of the housing at one or more predetermined frequencies.

Embodiments may include one or more of the following features.

In some cases, the one or more tuned mass dampers comprise a beam connected to the housing. The beam is integrally connected to (e.g., molded, machined, or otherwise formed with) the housing. The beam includes two or more layers that are configured to slide relative to each other. The beam includes a cantilever beam. The one or more tuned mass dampers further include a weight coupled to the beam. The weight is integral to the beam. The one or more tuned mass dampers further include a layer of energy absorbing material disposed between the beam and the weight. The energy absorbing material includes an elastomer, a viscoelastic adhesive, and/or a viscous liquid. The one or more tuned mass dampers further include a layer of substantially rigid material fixed to a surface of the energy absorbing layer. The substantially rigid material is disposed between the energy absorbing layer and the weight. The one or more predetermined frequencies are associated with one or more vibration modes of the housing. The test compartment is configured to receive and support a storage device transporter carrying a storage device for testing. The one or more tuned mass dampers are connected to an outer surface of the housing. The one or more tuned mass dampers are connected to an inner surface of the housing.

Embodiments can include one or more of the following advantages.

The addition of one or more tuned mass dampers to a storage device test slot can significantly reduce the vibration of the storage device test slot at one or more predetermined frequencies. The general design of the tuned mass damper allows it to be designed to attenuate several modes of the storage device test slot. The dimensions and properties of the cantilever beam, the metal weight, the rigid layer, and the energy absorbing layer can be adjusted so that the damper has vibration modes at several frequencies that may match several troublesome vibration modes of the storage device test slot.

DESCRIPTION OF DRAWINGS

FIG. 2B is a detailed perspective view of a carrier receptacle from the test rack of FIG. 2A.

Like reference symbols in the various drawings indicate like elements.

DETAILED DESCRIPTION

System Overview

Figure 1:
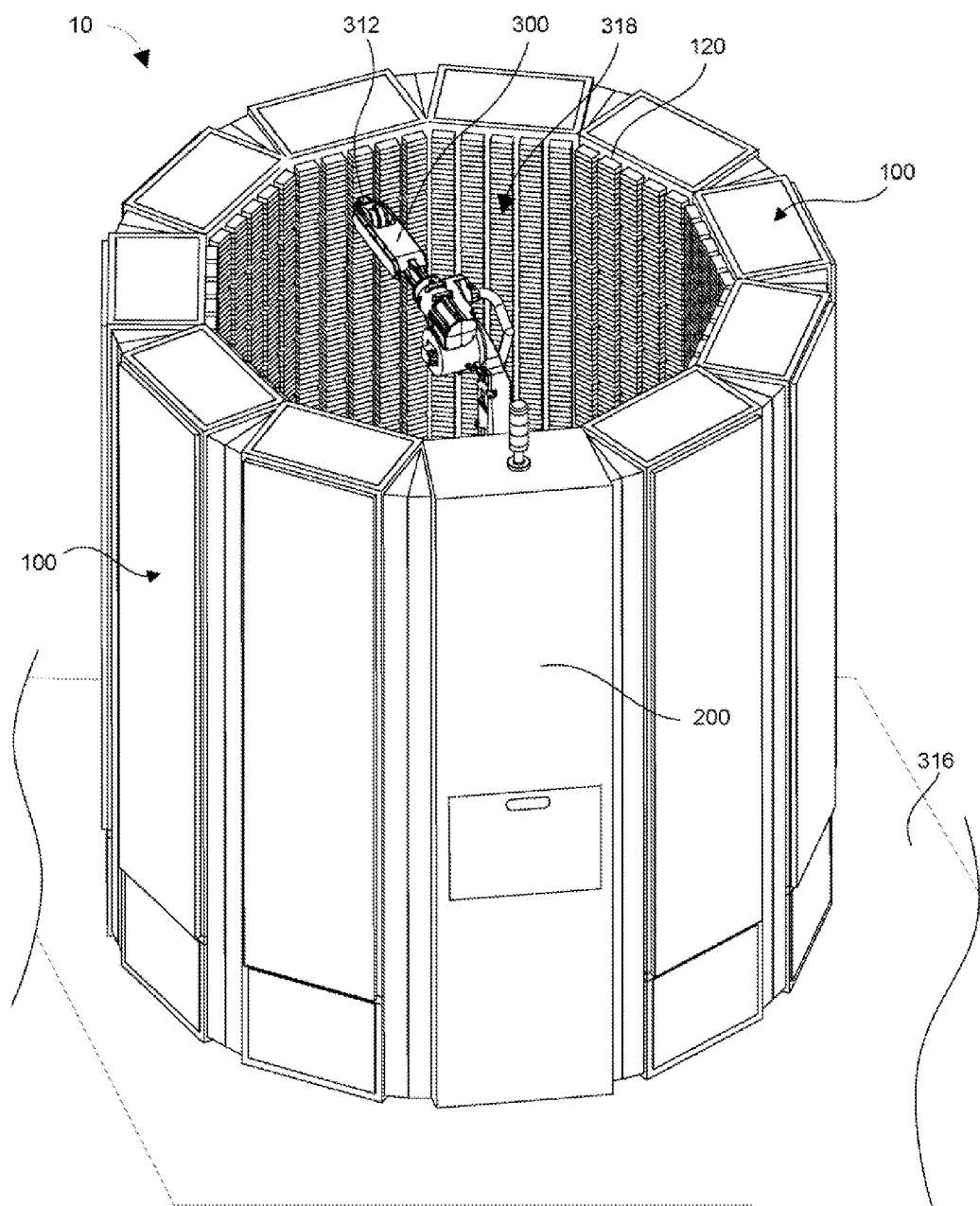
FIG. 1 is a perspective view of a storage device testing system.
Figure 2A:
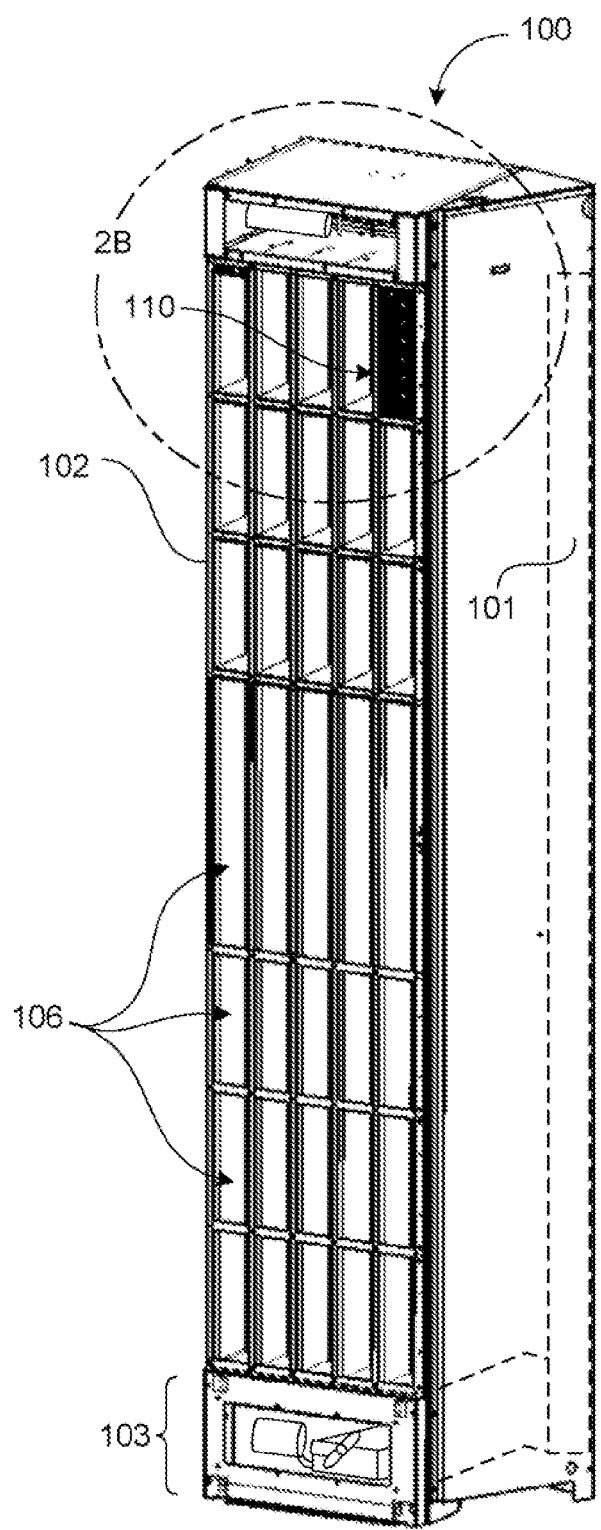
FIG. 2A is perspective view of a test rack.

As shown in FIG. 1, a storage device testing system 10 includes a plurality of test racks 100 (e.g., 10 test racks shown), a transfer station 200, and a robot 300. As shown in FIGS. 2A and 2B, each test rack 100 generally includes a chassis 102. The chassis 102 can be constructed from a plurality of structural members 104 (e.g., formed sheet metal, extruded aluminum, steel tubing, and/or composite members) which are fastened together and together define a plurality of carrier receptacles 106.

Figure 3A:
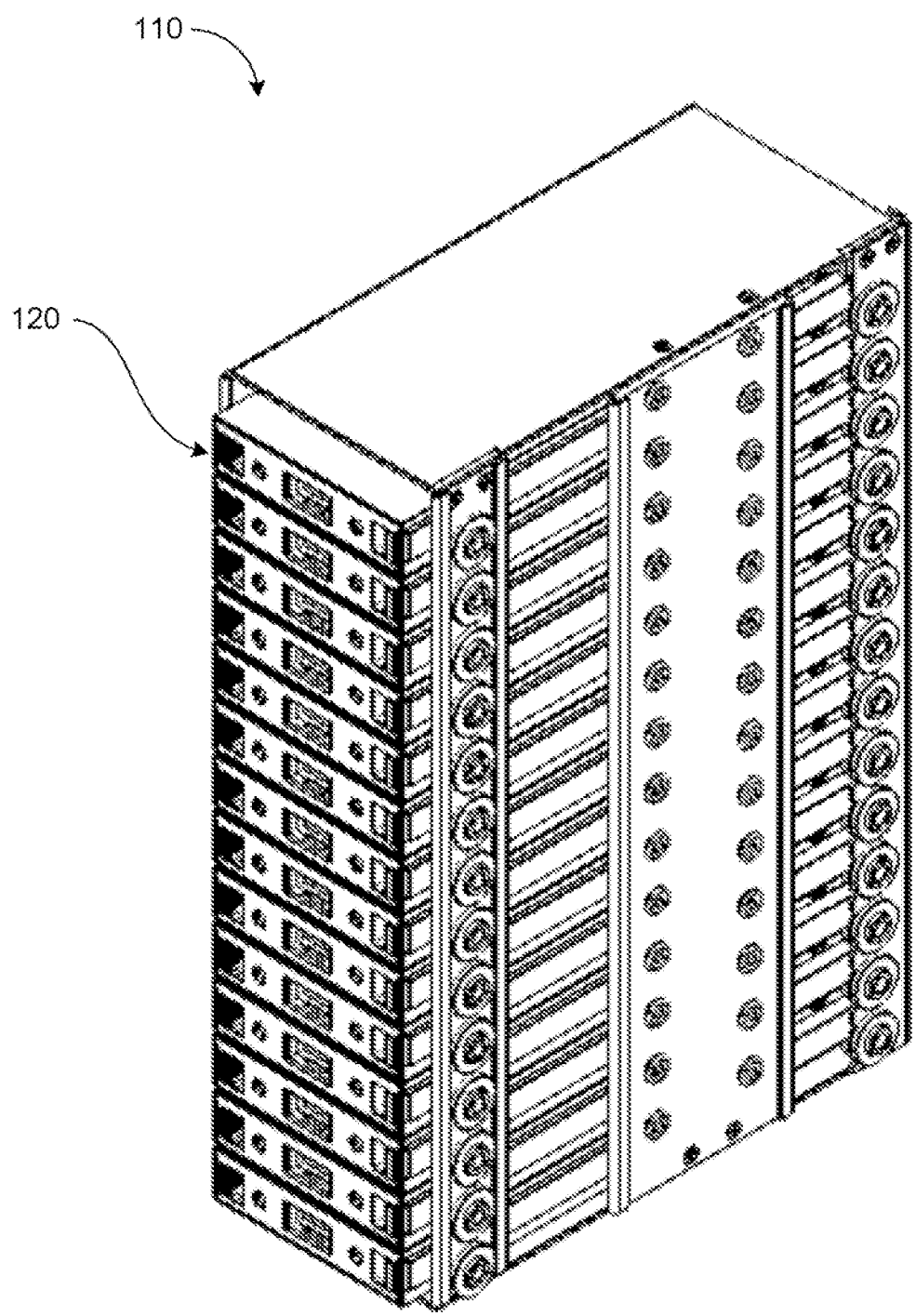
FIGS. 3A and 3B are perspective views of a test slot carrier.
Figure 3B:
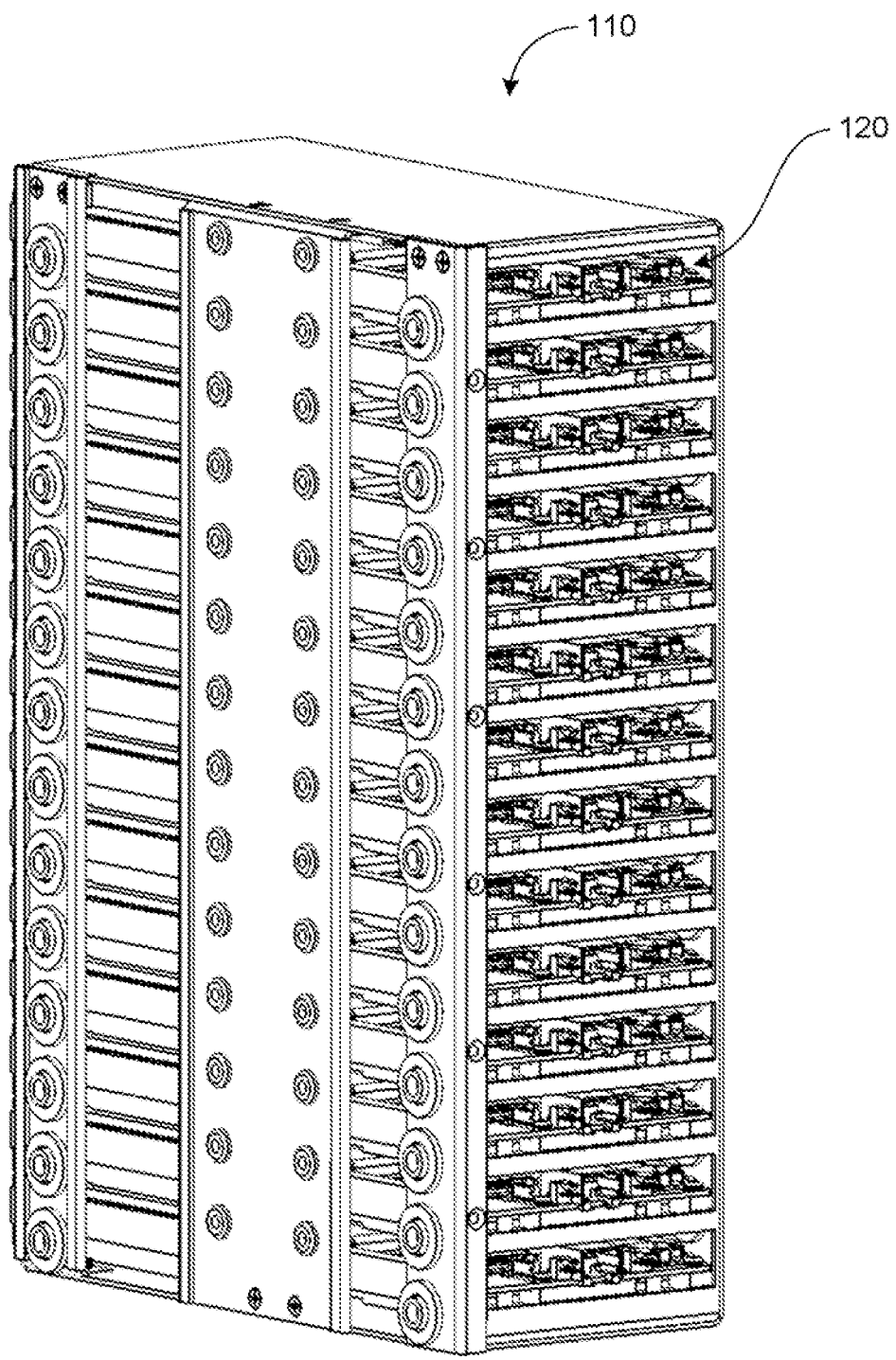

Each carrier receptacle 106 can support a test slot carrier 110. As shown in FIGS. 3A and 3B, each test slot carrier 110 supports a plurality of test slot assemblies 120. Different ones of the test slot carriers 110 can be configured for performing different types of tests and/or for testing different types of storage devices. The test slot carriers 110 are also interchangeable with each other within among the many carrier receptacles 106 within the testing system 10 allowing for adaptation and/or customization of the testing system 10, e.g., based on testing needs. In the example shown in FIG. 2A, an air conduit 101 provides pneumatic communication between each test slot assembly 120 of the respective test rack 100 and an air heat exchanger 103. The air heat exchanger 103 is disposed below the carrier receptacles 106 remote to received test slot carriers 110. Additional details of the test rack infrastructure and features combinable with those described herein may also be found in the following U.S. patent application filed Feb. 2, 2010, entitled "STORAGE DEVICE TESTING SYSTEM COOLING," inventor: Brian S. Merrow, and having assigned Ser. No. 12/698,575.

A storage device, as used herein, includes disk drives, solid state drives, memory devices, and any device that benefits from asynchronous testing. A disk drive is generally a non-volatile storage device which stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 4:
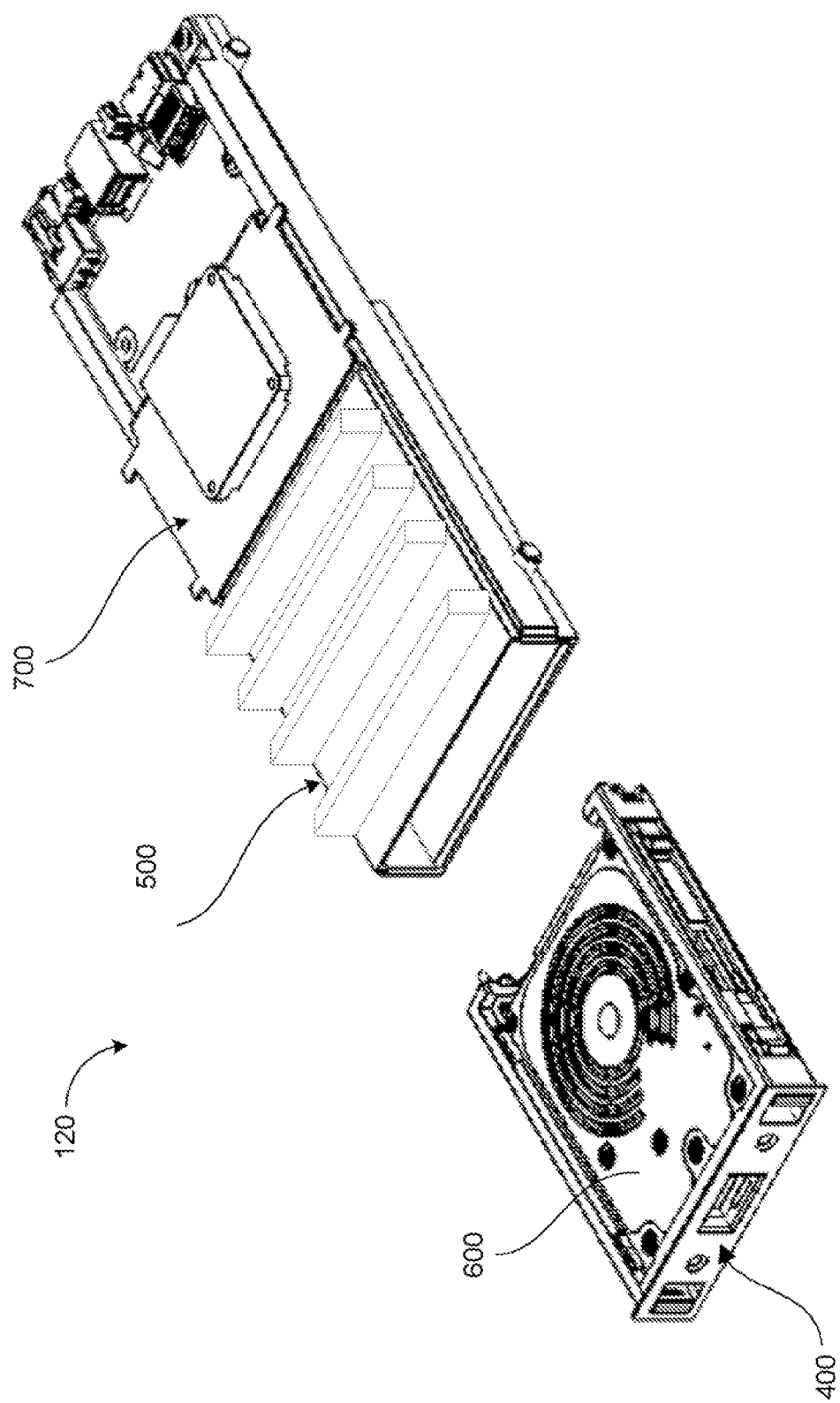
FIG. 4 is a perspective view of a test slot assembly.

As shown in FIG. 4, each test slot assembly 120 includes a storage device transporter 400, a test slot 500, and an associated air mover assembly 700. The storage device transporter 400 may be used for capturing storage devices 600 (e.g., from the transfer station 200) and for transporting the storage device 600 to one of the test slots 500 for testing.

Figure 5:
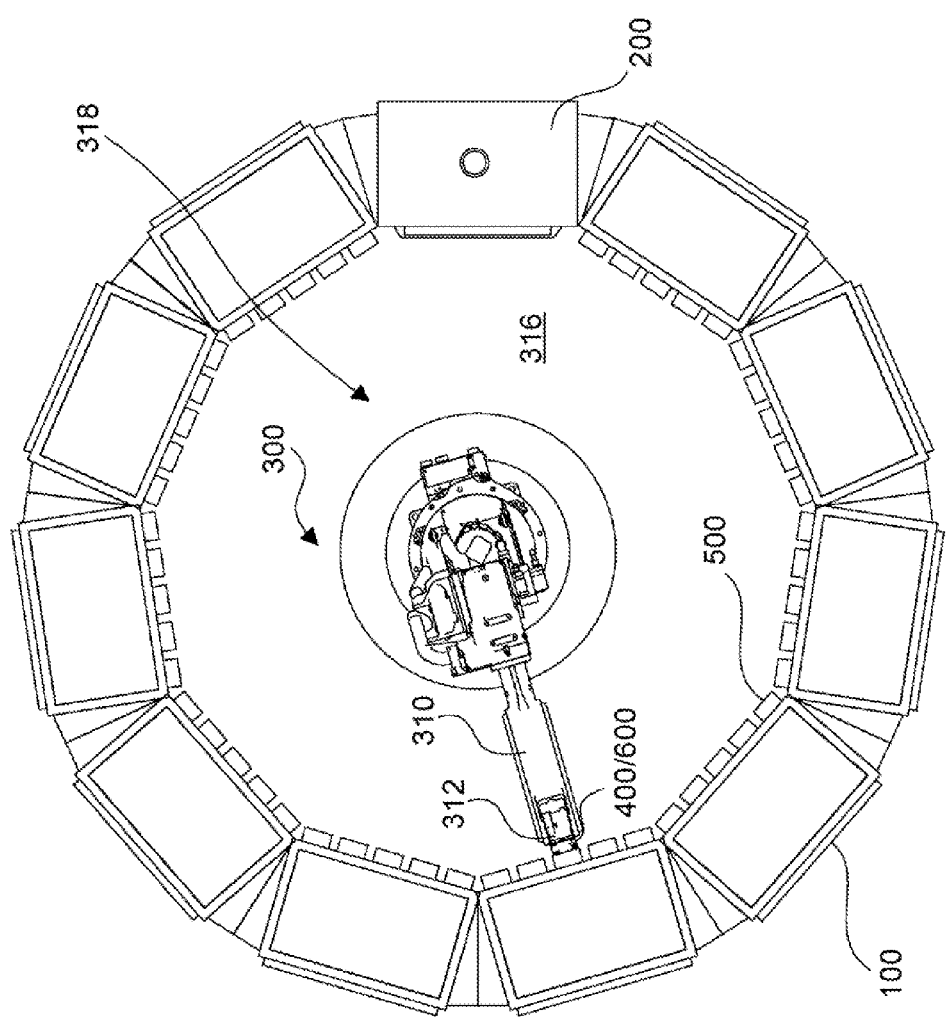
FIG. 5 is a top view of a storage device testing system.
Figure 6:
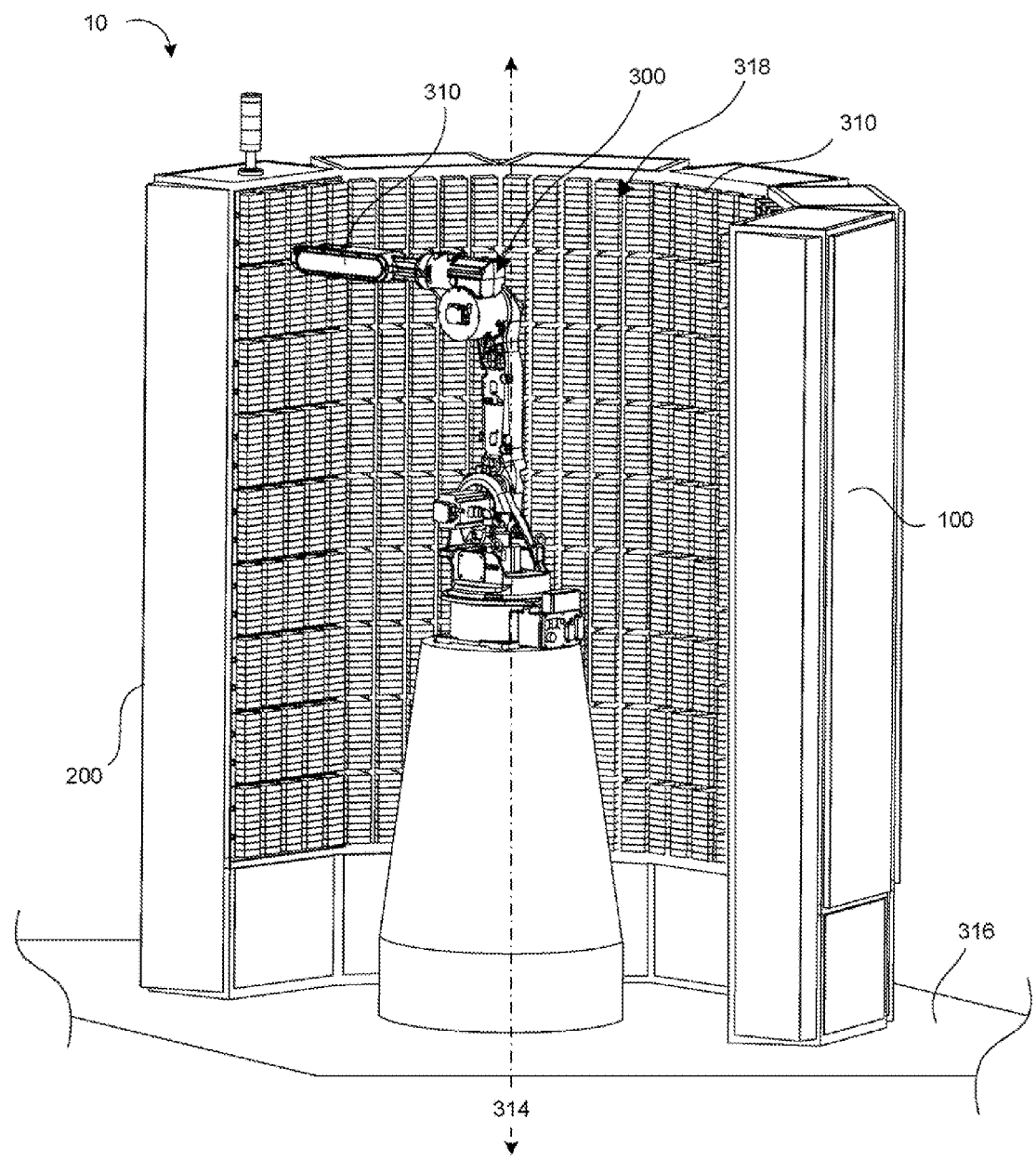
FIG. 6 is a perspective view of a storage device testing system.

Referring to FIGS. 5 and 6, the robot 300 includes a robotic arm 310 and a manipulator 312 (FIG. 5) disposed at a distal end of the robotic arm 310. The robotic arm 310 defines a first axis 314 (FIG. 6) normal to a floor surface 316 and is operable to rotate through a predetermined arc about and extends radially from the first axis 314 within a robot operating area 318. The robotic arm 310 is configured to independently service each test slot 500 by transferring storage devices 600 between the transfer station 200 and the test racks 100. In some embodiments, the robotic arm 310 is configured to remove a storage device transporter 400 from one of the test slots 500 with the manipulator 312, then pick up a storage device 600 from the transfer station 200 with the storage device transporter 400, and then return the storage device transporter 400, with a storage device 600 therein, to the test slot 500 for testing of the storage device 600. After testing, the robotic arm 310 retrieves the storage device transporter 400, along with the supported storage device 600, from one of the test slots 500 and returns it to the transfer station 200 (or moves it to another one of the test slots 500) by manipulation of the storage device transporter 400 (i.e., with the manipulator 312). In some embodiments, the robotic arm 310 is configured to pick up a storage device 600 from the transfer station 200 with the manipulator 312, then move the storage device 600 to a test slot 500, and deposit the storage device 600 in the test slot 500 by means of depositing the storage device 600 in the storage device transporter 400 and then inserting the storage device transporter in the test slot 500. After testing, the robotic arm 310 uses the manipulator 312 to remove the storage device 600 from the storage device transporter 400 and return it to the transfer station 200.

Figure 7A:
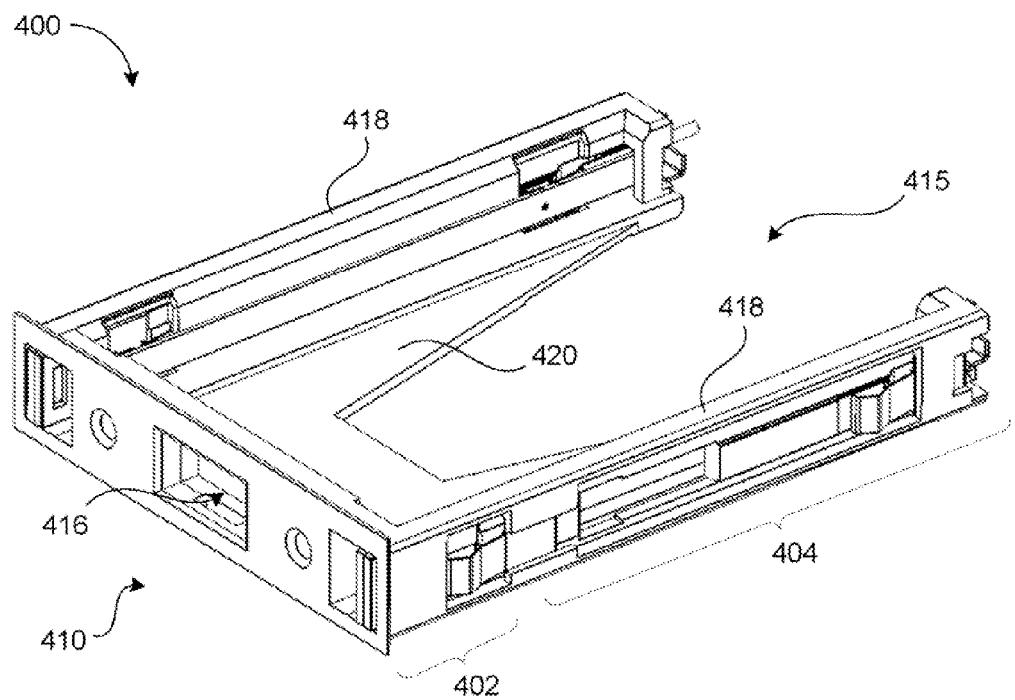
FIGS. 7A and 7B are perspective views of a storage device transporter.
Figure 7B:
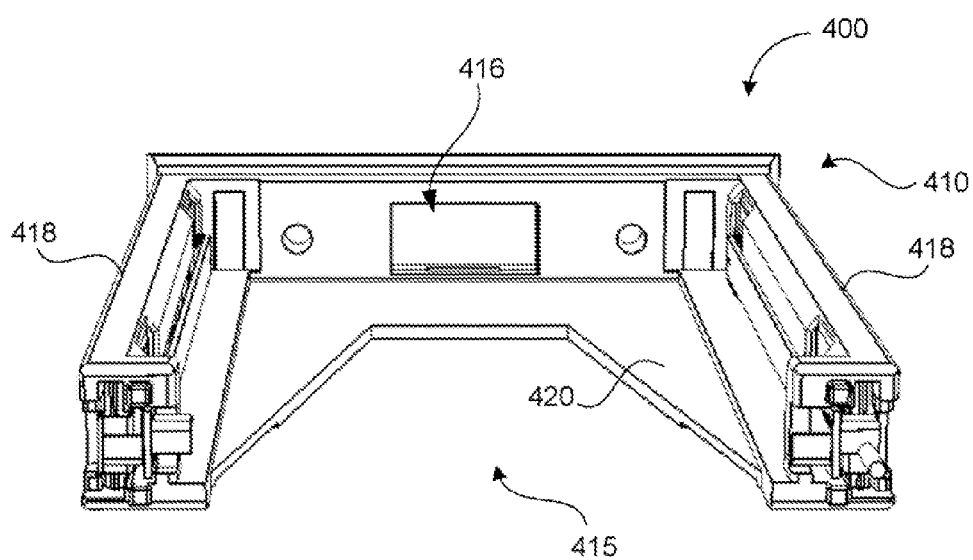

Referring to FIGS. 7A and 7B, the storage device transporter 400 includes a frame 410. The frame 410 includes a face plate 412. As shown in FIG. 7A, along a first surface 414, the face plate 412 defines an indentation 416. The indentation 416 can be releaseably engaged by the manipulator 312 (FIG. 5) of the robotic arm 310, which allows the robotic arm 310 to grab and move the transporter 400. As shown in FIG. 7B, the face plate 412 also includes beveled edges 417. As illustrated in FIGS. 7A and 7B, the storage device transporter 400 includes a transporter body 410 having first and second portions 402, 404. The first portion 402 of the transporter body 410 includes a manipulation feature 416 (e.g., indention, protrusion, aperture, etc.) configured to receive or otherwise be engaged by the manipulator 312 (FIG. 5) for transporting. The second portion 404 of the transporter body 410 is configured to receive a storage device 600. In some examples, the second transporter body portion 404 defines a substantially U-shaped opening 415 formed by first and second sidewalls 418 and a base plate 420 of the transporter body 410. The storage device 600 is received in the U-shaped opening 415.

Figure 8A:
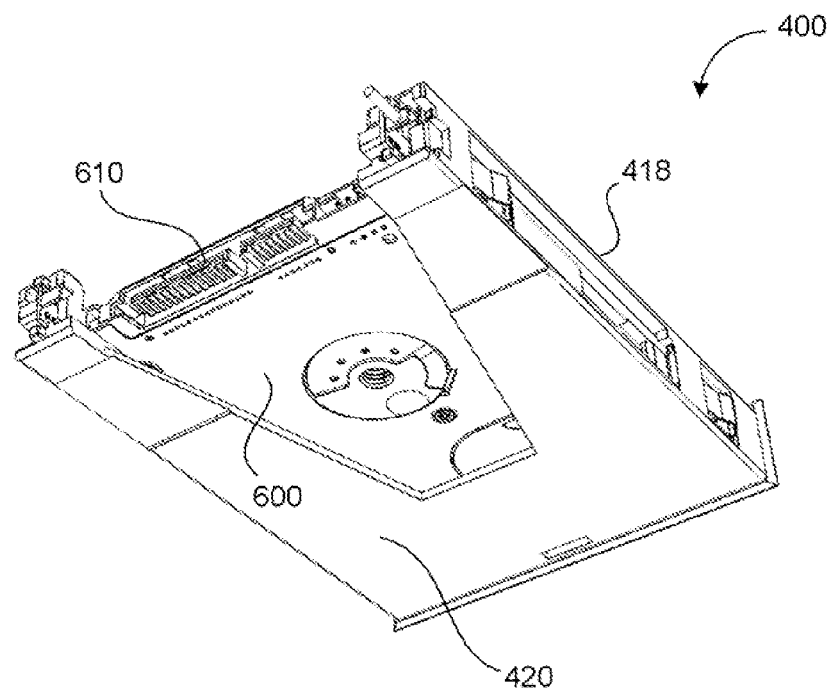
FIG. 8A is a perspective view of a storage device transporter supporting a storage device.
Figure 8B:
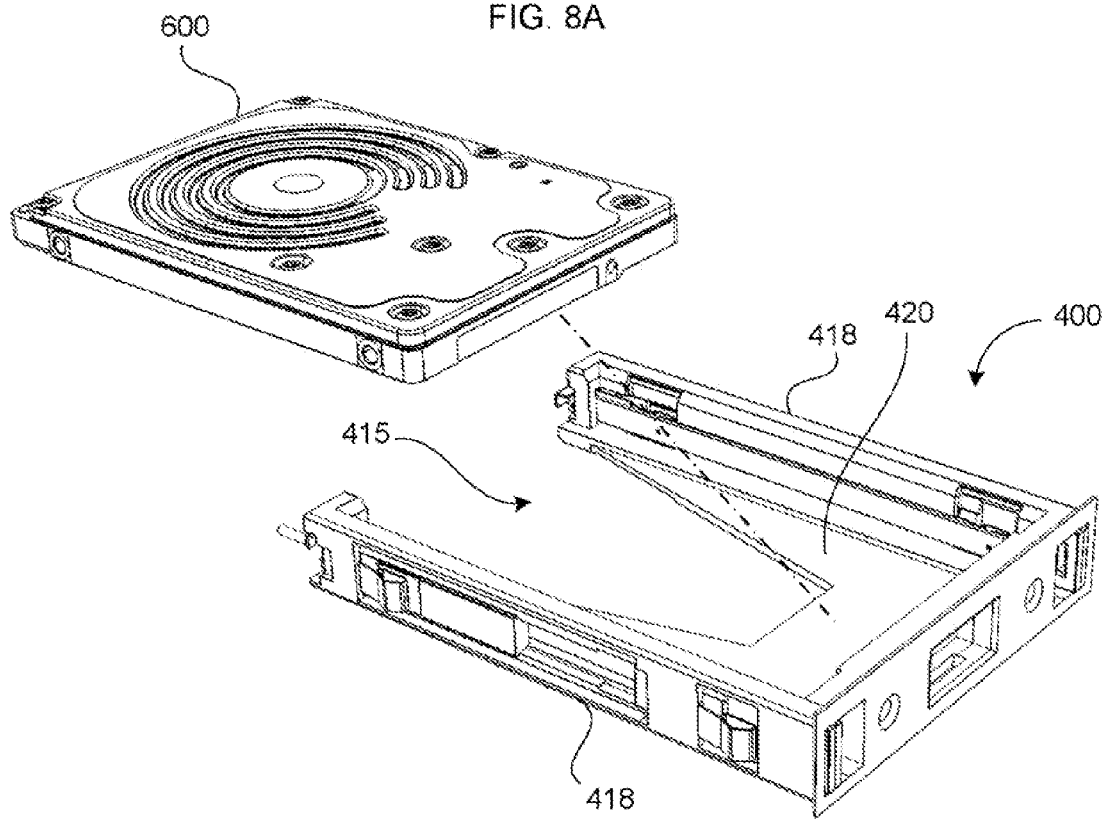
FIG. 8B is a perspective view of a storage device transporter receiving a storage device.
Figure 8C:
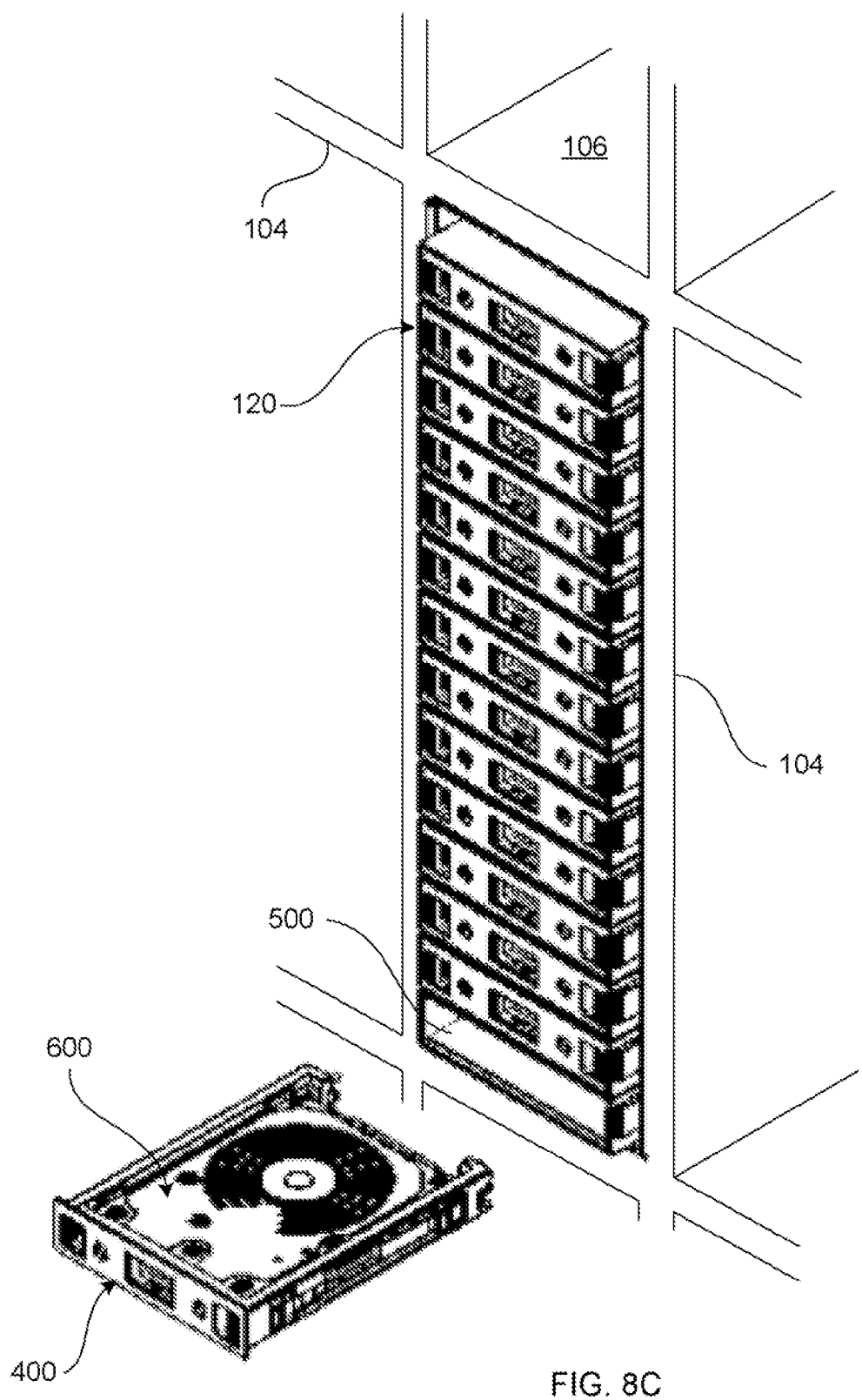
FIG. 8C is a perspective view of a storage device transporter carrying a storage device aligned for insertion into a test slot.

As illustrated in FIGS. 8A and 8B, with the storage device 600 in place within the frame 410 of the storage device transporter 400, the storage device transporter 400 and the storage device 600 together can be moved by the robotic arm 310 (FIG. 6) for placement within one of the test slots 500. A detailed description of the manipulator and other details and features combinable with those described herein may be found in the following U.S. patent application filed Apr. 17, 2008, entitled "Transferring Disk Drives Within Disk Drive Testing Systems", inventors: Evgeny Polyakov et al., and having assigned Ser. No. 12/104,536, the entire contents of the aforementioned applications are hereby incorporated by reference.

Figure 9:
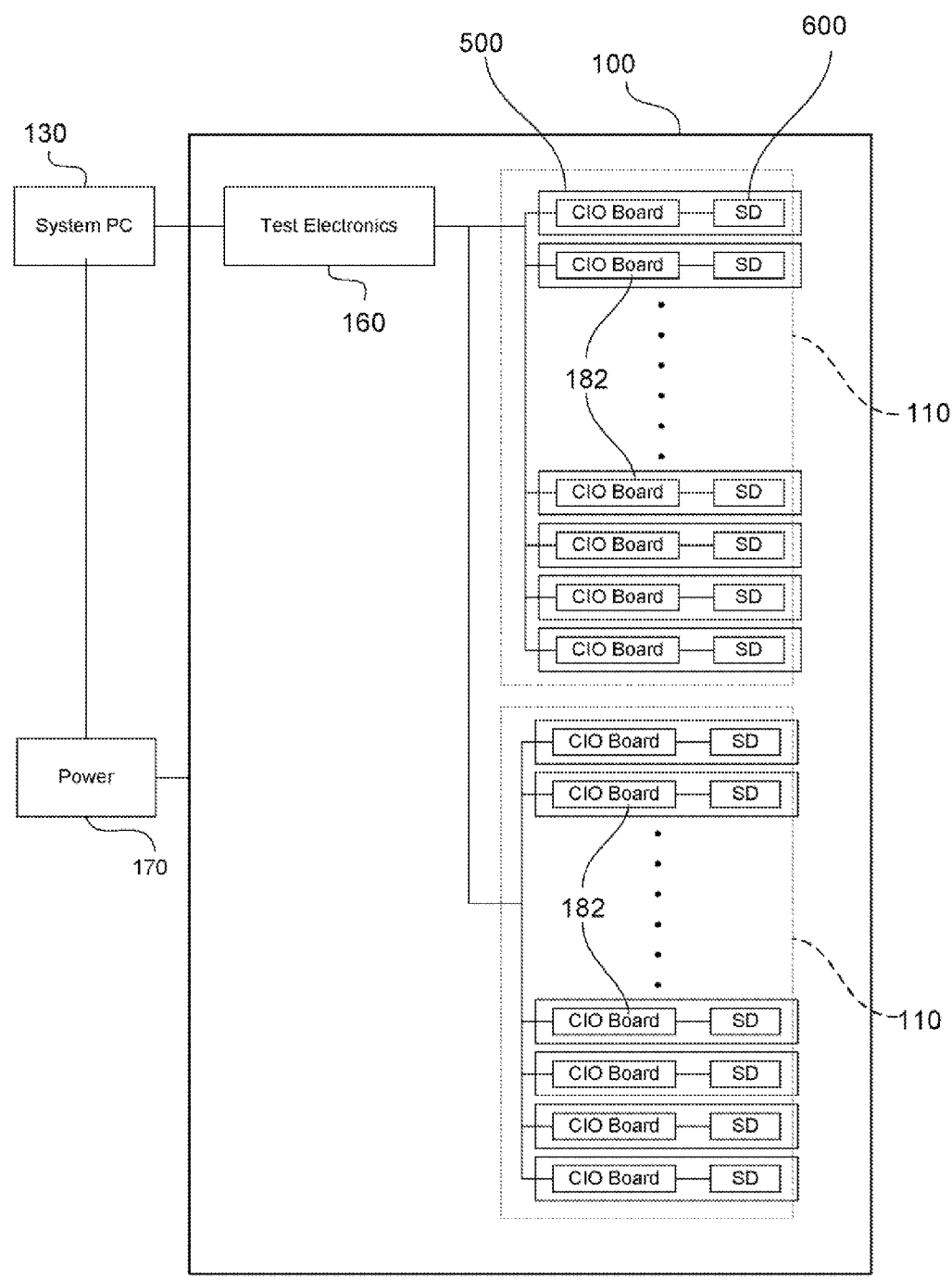
FIG. 9 is a schematic view of test circuitry.

Referring to FIG. 9, in some implementations, the storage device testing system 10 can also include at least one computer 130 in communication with the test slots 500. The computer 130 may be configured to provide inventory control of the storage devices 600 and/or an automation interface to control the storage device testing system 10. Test electronics 160 are in communication with each test slot 500. The test electronics 160 are in electrical communication with connection interface circuits 182 that are disposed within each the test slots 500. These connection interface circuits 182 are arranged for electrical communication with a storage device 600 received within the associated test slot 500, and thereby provide for communication between the test electronics 160 and storage devices 600 within the test slots 500, e.g., for executing test routines. The test routines may include a functionality test, which can include testing the amount of power received by the storage device 600, the operating temperature, the ability to read and write data, and the ability to read and write data at different temperatures (e.g. read while hot and write while cold, or vice versa). The functionality test may test every memory sector of the storage device 600 or only random samplings. The functionality test may test an operating temperature of the storage device 600 and also the data integrity of communications with the storage device 600.

As shown in FIG. 9, a power system 170 supplies power to the storage device testing system 10. The power system 170 may monitor and/or regulate power to the received storage device 600 in the test slot 500

Test Slot

Figure 10:
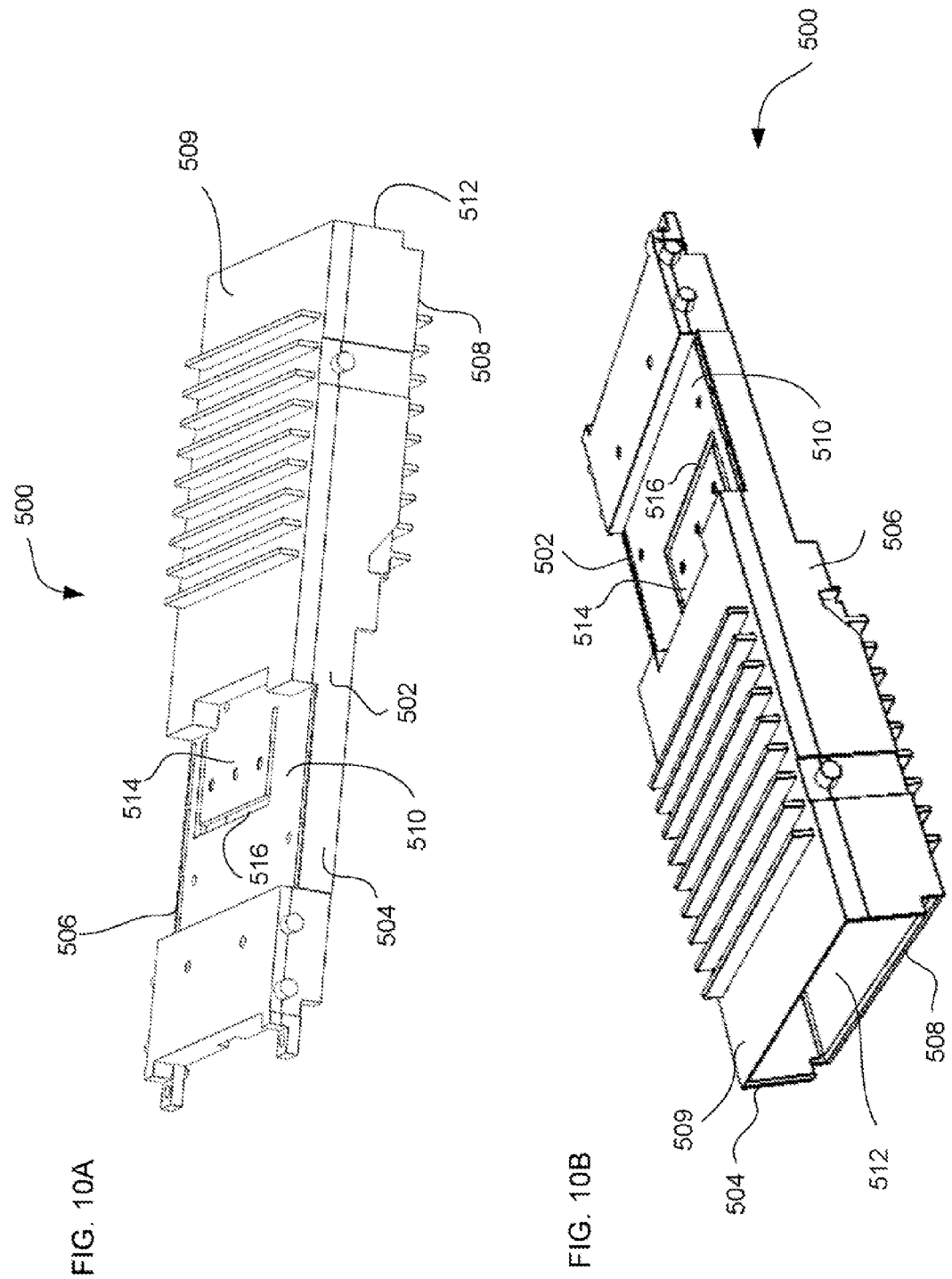
FIGS. 10A, 10B, and 11 are perspective views of a test slot.

As shown in FIGS. 10A and 10B, the test slots 500 include a housing 502 that forms a number of surfaces. The housing 502 forms a first sidewall 504, a second sidewall 506, a top panel 508, a first bottom panel 509, and a second bottom panel 510. In the example of FIGS. 10A and 10B, for purposes of illustration only, the test slot 500 is oriented so that the bottom panel 510 is upward-facing.

Figure 11:
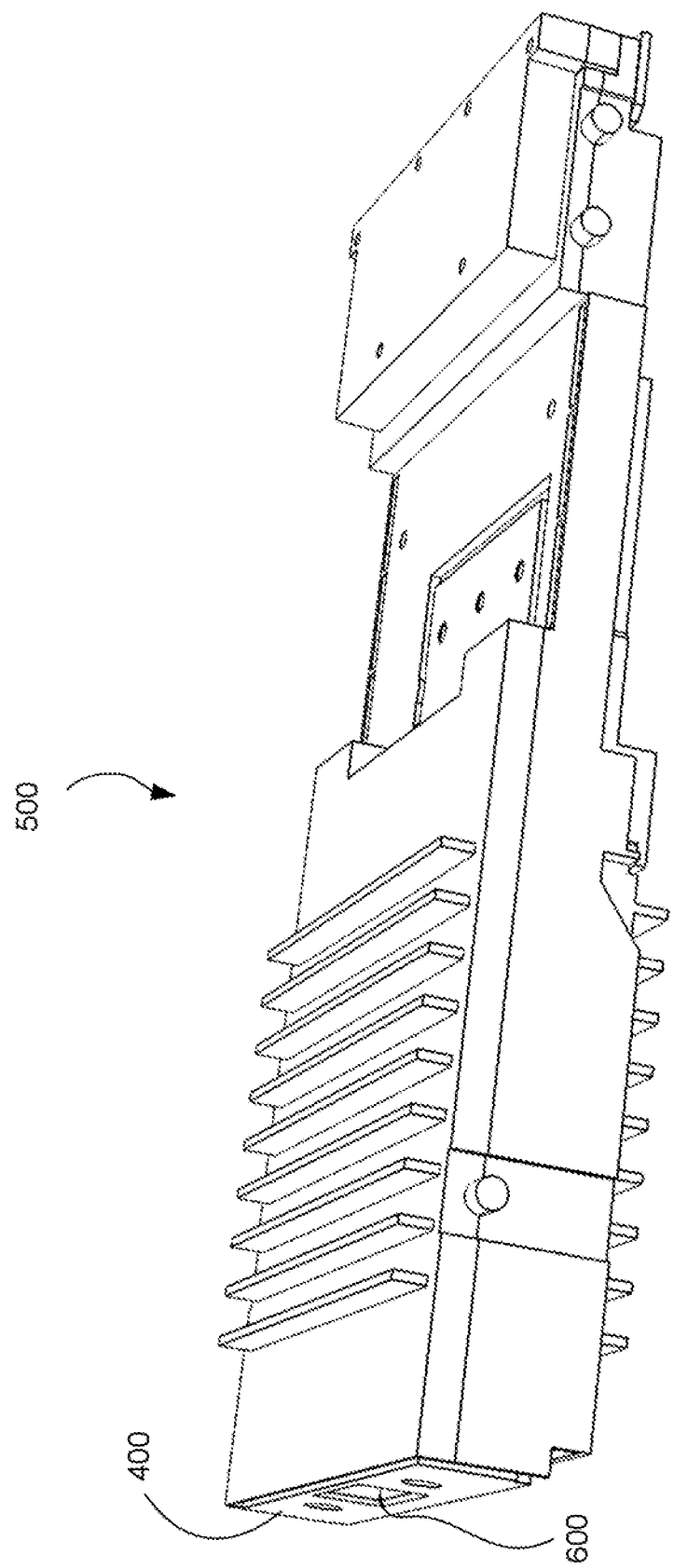

In one end of the test slot 500, the housing 502 forms an opening 512 that is defined by sidewalls 504, 506, top panel 508, and the first bottom panel 509. The opening 512 can be designed to receive and support a storage device 600 (FIG. 8B), or a storage device transporter 400 and a storage device 600 together (FIG. 8B). An example of the test slot containing both a storage device 600 and a storage device transporter 400 is shown in FIG. 11.

Once a storage device has been placed in the test slot 500, various tests can be carried out on the storage device, such as those tests described above. During testing, the storage devices are susceptible to the vibration of various components. For example, during the test process, the test slot 500 contains the storage device, electronics, fans, heaters, and other part needed to accomplish the tests. While any of these components can cause unwanted vibration that may adversely affect the test, another source of vibration in the test slot 500 is vibration modes of the test slot 500 itself. Vibration modes of the test slot 500 can amplify vibrations from the storage devices, fans, outside acoustic noise, and other sources.

Figure 12:
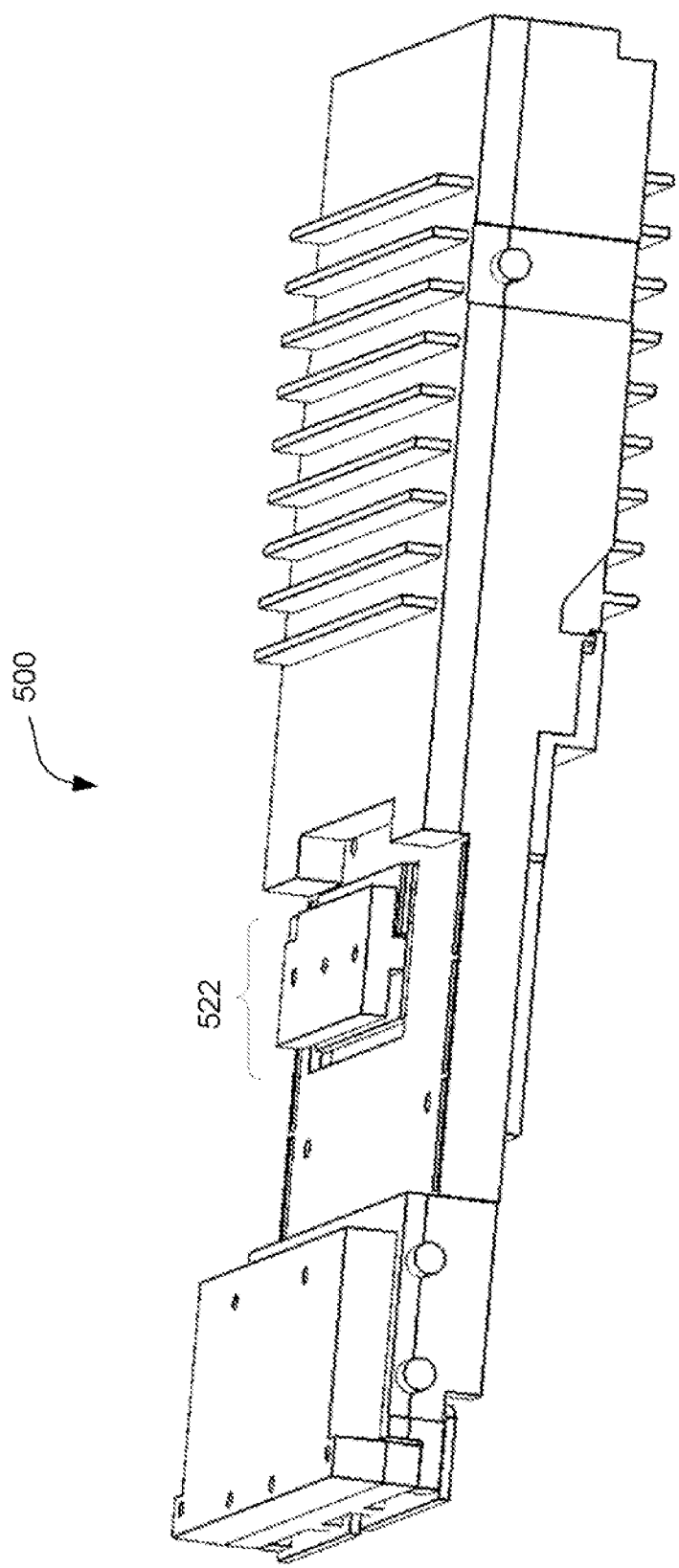
FIG. 12 is a perspective view of a test slot that includes a tuned mass damper.

In order to reduce the vibration of the test slot 500, a device designed to accept vibration energy at one or more specific frequencies and then dissipate the energy can be added to a portion of the test slot. As shown in FIG. 12, 522 the second bottom panel 510 is provided with a tuned mass damper 522 to attenuate one or more of vibration modes of the test slot 500 by absorbing and dissipating vibration energy.

Figure 13:
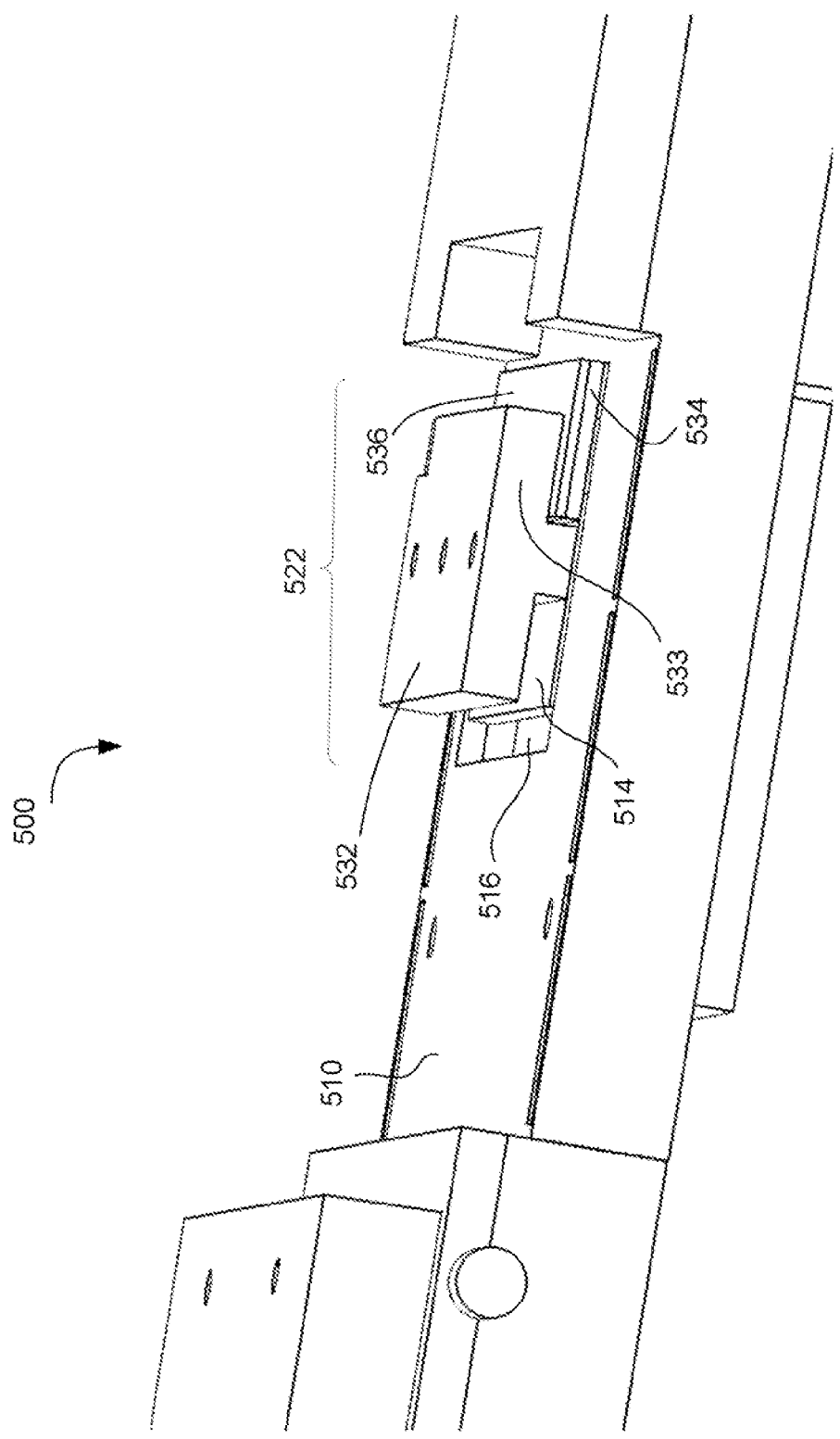
FIG. 13 is a magnified perspective views of a tuned mass damper on a test slot.

A more detailed view of the tuned mass damper 522 is shown in FIG. 13. The tuned mass damper 522 consists of a number of components. A cantilever beam 514 (best seen in FIGS. 10A and 10B) lies at the base of the tuned mass damper 522. The cantilever beam 514 is shown as being integral to the test slot 500 (specifically, to second bottom panel 510), and can be formed by cutting a groove through the second bottom panel 510 of the test slot 500. It is not necessary that the cantilever beam be integral to the test slot 500; however, this design allows the cantilever beam 514 to be compact and to fit into the scarce free space of the test slot 500. In some alternative, the cantilever beam 514 may, instead, be formed as a separate piece that is coupled to test slot A weight 532 (FIG. 13) is connected (e.g., coupled to or integrally formed in) to the cantilever beam 514. The weight includes a lip 533 that overhangs the cantilever beam 514. Between the lip 533 of the weight 532 and the cantilever beam 514 lie two material layers. The first material layer is an energy absorbing layer 534 that is connected (e.g., coupled to or integrally formed in) to the cantilever beam 514. The energy absorbing layer can include, for example, an energy absorbing elastomer. The second material layer is a rigid layer 536 composed of a rigid material (e.g., metal or plastic) and is attached to the surface of the energy absorbing layer 534. The rigid layer 536 serves to increase strain in the energy absorbing layer 534, which improves its ability to absorb energy. The rigid layer 536 also serves to augment the stiffness of the cantilever beam.

The dimensions and materials selected for the components of the mass tuned damper 522 are selected so that the tuned mass damper 522 has one or more vibration modes at approximately the same frequencies as the vibration modes of the test slot 500. The tuned mass damper 522 can be located on the test slot 500 at a point that vibrates significantly during testing. As a result, the vibration modes of the tuned mass damper 522 will be excited when the housing 502 of the test slot 500 vibrates, causing vibration energy to flow into the tuned mass damper 522, and then to be absorbed and dissipated by the energy absorbing layer 534.

Figure 14:
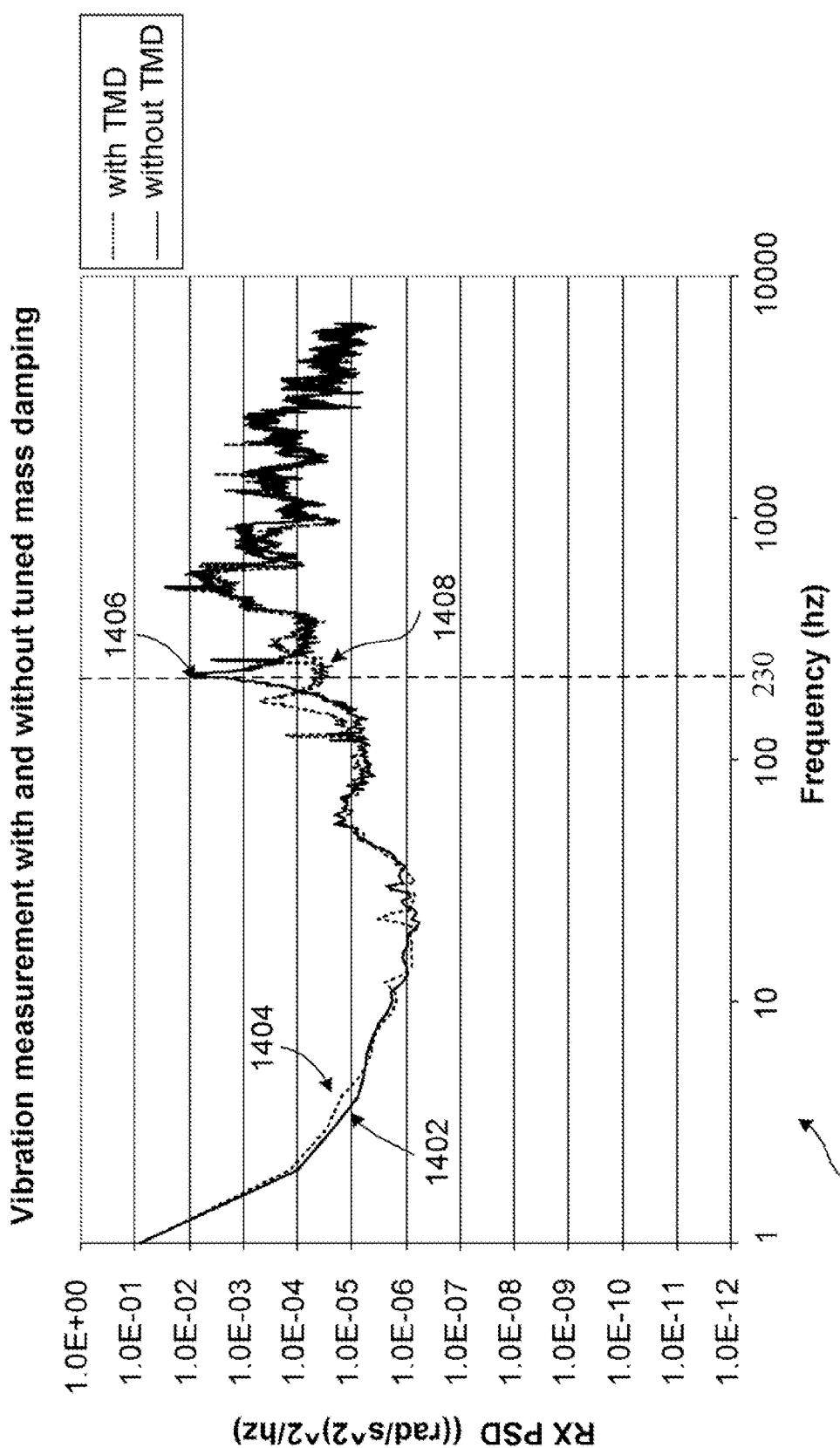
FIG. 14 is a graph showing vibration measurement with and without tuned mass damping.

FIG. 14 is an exemplary graph 1400 showing the vibration level 1402 (solid line) of a test slot without a tuned mass damper versus the dampened vibration level 1404 (dashed line) of a test slot equipped with a tuned mass damper. As stated above, the tuned mass damper is designed to absorb vibration energy at predetermined frequencies. In the example of FIG. 14, the tuned mass damper has been designed to absorb vibration energy at approximately 230 hz. By comparing a peak 1406 of the vibration level 1402 with a corresponding peak 1408 of the dampened vibration level 1404, it is evident that the tuned mass damper inhibits vibration of the test slot on which it is installed at a frequency of 230 hz.

Tuned mass dampers can be located on the test slot in any location having suitable space. While in the examples above the tuned mass damper is located in the second bottom panel of the test slot, the tuned mass damper (or additional tuned mass dampers) could be added to, for example, the sidewalls, the first bottom panel, and/or the top panel.

A number of variations relating to the cantilever beam are possible. For example, instead of a cantilever beam, the beam could be attached at both ends to the housing of the test slot, leaving the center of the beam free to move. The beam can be made from layers that are not bonded together. In this case the layers would be free to slide relative to each other when the beam flexes, allowing the action of friction between the sliding surfaces to absorb energy and to further reduce vibration. In some examples the cantilever beam could be non-integral to the second bottom panel. For example, the cantilever beam could be formed separately from the bottom panel and mounted in an opening in the bottom panel. The cantilever beam can be shaped so that it remains more or less within the plane of the second bottom panel.

The selection of materials for various components of the tuned mass damper is a matter of design choice and should not be limited to the exemplary materials described in this disclosure. In some examples, the weight can be formed of a filled plastic, metal, or other suitably heavy material. In some examples, the energy absorbing layer could be formed of a viscoelastic adhesive, a viscous liquid, or an elastomer.

The location and number of energy absorbing layers is also a matter of design choice, and can be modified for particular applications. For example, the energy absorbing layer could be located at a center plane of the cantilever beam, rather than, or in addition to, being applied to beam surface. Furthermore, two energy absorbing layers could be connected to opposite sides of the cantilever beam, or at opposite ends of the cantilever beam.

In some examples, the rigid layer can be omitted to make the tuned mass damper more compact.

A number of implementations have been described. Nevertheless, it will be understood that various modifications may be made without departing from the spirit and scope of the disclosure. For example, the protrusions on the test slots that interface with the isolators in the body could be embodied as protrusions on the body that interface with isolators on the test slots. Accordingly, other implementations are within the scope of the following claims.

What is claimed is:

1. A storage device test slot comprising:
 a housing defining a test compartment for receiving a storage device for testing; and
 one or more tuned mass dampers connected to the housing, the one or more tuned mass dampers being configured to inhibit vibration of the housing at one or more predetermined frequencies.

2. The storage device test slot of claim 1, wherein the one or more tuned mass dampers comprise a beam connected to the housing.

3. The storage device test slot of claim 2, wherein the beam is integrally connected to the housing.

4. The storage device test slot of claim 2, wherein the beam comprises two or more layers that are configured to slide relative to each other.

5. The storage device test slot of claim 2, wherein the beam comprises a cantilever beam.

6. The storage device test slot of claim 2, wherein the one or more tuned mass dampers further comprise a weight connected to the beam.

7. The storage device test slot of claim 6, wherein the weight is integrally connected (e.g., molded, machined, or otherwise formed with) to the beam.

8. The storage device test slot of claim 6, wherein the one or more tuned mass dampers further comprise a layer of energy absorbing material disposed between the beam and the weight.

9. The storage device test slot of claim 8, wherein the energy absorbing material is selected from a group consisting of: an elastomer, a viscoelastic adhesive, and a viscous liquid.

10. The storage device test slot of claim 8, wherein the one or more tuned mass dampers further comprise a layer of substantially rigid material fixed to a surface of the energy absorbing layer.

11. The storage device test slot of claim 1, wherein the one or more predetermined frequencies are associated with one or more vibration modes of the housing.

12. The storage device test slot of claim 1, wherein the test compartment is configured to receive and support a storage device transporter carrying a storage device for testing.

13. The storage device test slot of claim 1, wherein the one or more tuned mass dampers are connected to an outer surface of the housing.

14. The storage device test slot of claim 1, wherein the one or more tuned mass dampers are connected to an inner surface of the housing.

* * * * *

UNITED STATES PATENT AND TRADEMARK OFFICE
CERTIFICATE OF CORRECTION

PATENT NO. : 9,779,780 B2  
APPLICATION NO. : 12/817614  
DATED : October 3, 2017  
INVENTOR(S) : Peter Martino Page 1 of 1

It is certified that error appears in the above-identified patent and that said Letters Patent is hereby corrected as shown below:

In the "References Cited" item (56), page 3, Column 1:

Please insert -- 6,718,164 A1 4/2004 Korneluk et al. -- after -- 6,693,757 B2 2/2004 Hayakawa et al. --

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*